US009800200B2

(12) United States Patent
Higuchi et al.

(10) Patent No.: US 9,800,200 B2
(45) Date of Patent: Oct. 24, 2017

(54) SOLAR CELL APPARATUS

(71) Applicant: Panasonic Intellectual Property Management Co., Ltd., Osaka-shi, Osaka (JP)

(72) Inventors: Minoru Higuchi, Osaka (JP); Yutaka Arai, Osaka (JP); Mamoru Arimoto, Osaka (JP); Ryo Goto, Hyogo (JP); Koichi Kubo, Osaka (JP); Yoshihide Kawashita, Osaka (JP)

(73) Assignee: PANASONIC INTELLECTUAL PROPERTY MANAGEMENT CO., LTD., Osaka-shi (JP)

( * ) Notice: Subject to any disclaimer, the term of this patent is extended or adjusted under 35 U.S.C. 154(b) by 0 days.

(21) Appl. No.: 15/278,786

(22) Filed: Sep. 28, 2016

(65) Prior Publication Data

US 2017/0019059 A1    Jan. 19, 2017

Related U.S. Application Data

(63) Continuation of application No. PCT/JP2015/001637, filed on Mar. 23, 2015.

(30) Foreign Application Priority Data

Mar. 31, 2014  (JP) ................................. 2014-074308

(51) Int. Cl.
*H02S 20/00*      (2014.01)
*H02S 20/23*      (2014.01)
(Continued)

(52) U.S. Cl.
CPC ............. *H02S 20/23* (2014.12); *F24J 2/5205* (2013.01); *F24J 2/5211* (2013.01); *F24J 2/5245* (2013.01);
(Continued)

(58) Field of Classification Search
CPC ......... Y02E 10/47; Y02E 10/50; H02S 20/23; H02S 20/00; Y02B 10/12
(Continued)

(56) References Cited

U.S. PATENT DOCUMENTS 7,915,519 B2 * 3/2011 Kobayashi ............. F24J 2/5211
126/623
7,956,280 B2 * 6/2011 Kobayashi ............. F24J 2/5211
126/704
(Continued)

FOREIGN PATENT DOCUMENTS

EP    1 647 782 A2    4/2006
JP    11-13238 A      1/1999
(Continued)

OTHER PUBLICATIONS

Notification of Transmittal of Translation of the International Preliminary Report on Patentability (Forms PCT/IB/326) issued in counterpart International Application No. PCT/JP20151001637 dated Oct. 13, 2016, with Forms PCT/IB/373, PCT/IB/338, PCT/IB/308 and PCT/ISA/237. (12 pages).
(Continued)

*Primary Examiner* — Brian Glessner
*Assistant Examiner* — Daniel Kenny
(74) *Attorney, Agent, or Firm* — Westerman, Hattori, Daniels & Adrian, LLP

(57)    ABSTRACT

This solar cell apparatus is provided with: a long mounting frame having a guide rail section in an upper portion; and a fixing member, which is provided by being slid and moved in the longitudinal direction of the mounting frame, and which is fixed at a predetermined position of the mounting frame. The fixing member has: a base section that engages with the guide rail section; an upright wall section that is provided to stand on the base section; and insertion sections
(Continued)

that extend from the upright wall section such that the insertion sections are inserted into a module frame of an eave-side solar cell module and a module frame of a ridge-side solar cell module.

9 Claims, 20 Drawing Sheets

(51) Int. Cl.
  *F24J 2/52* (2006.01)
  *H02S 30/10* (2014.01)
(52) U.S. Cl.
  CPC ............ *F24J 2/5254* (2013.01); *F24J 2/5262* (2013.01); *H02S 30/10* (2014.12); *F24J 2002/5215* (2013.01); *F24J 2002/5226* (2013.01); *Y02B 10/12* (2013.01); *Y02E 10/47* (2013.01)
(58) Field of Classification Search
  USPC .......................................... 52/173.3; 136/251
  See application file for complete search history.

(56) References Cited

U.S. PATENT DOCUMENTS

| | | | |
|---|---|---|---|
| 8,453,394 B2* | 6/2013 | Kobayashi | ............. F24J 2/5245 126/704 |
| 2008/0011921 A1 | 1/2008 | Aramaki et al. | |
| 2011/0047903 A1 | 3/2011 | Kobayashi | |
| 2011/0070765 A1 | 3/2011 | Kobayashi | |
| 2013/0032200 A1 | 2/2013 | Schnitzer et al. | |
| 2015/0013754 A1 | 1/2015 | Yakushiji et al. | |
| 2016/0268959 A1* | 9/2016 | Meine | .................... H02S 40/36 |

FOREIGN PATENT DOCUMENTS

| | | | |
|---|---|---|---|
| JP | 11-159071 A | | 6/1999 |
| JP | 2007-285096 A | | 11/2007 |
| JP | 2010-209583 A | | 9/2010 |
| JP | WO2011/074100 | * | 6/2011 |
| JP | 2012-149403 A | | 8/2012 |
| JP | 2012-193569 A | | 10/2012 |
| JP | 2013-163951 A | | 8/2013 |
| JP | 2013-221393 A | | 10/2013 |
| WO | 2010/125699 A1 | | 11/2010 |
| WO | 2013/114767 A1 | | 8/2013 |

OTHER PUBLICATIONS

International Search Report dated May 26, 2015, issued in counterpart International Application No. PCT/JP2015/001637 (2 pages).

Extended (supplementary) European Search Report dated Mar. 9, 2017, issued in counterpart European Application No. 15772699.3. (8 pages).

* cited by examiner (a)

(b)

SOLAR CELL APPARATUS

CROSS-REFERENCE TO RELATED APPLICATIONS

The present application is a continuation under 35 U.S.C. §120 of PCT/JP2015/001637, filed Mar. 23, 2015, which is incorporated herein by reference and which claimed priority to Japanese Patent Application No. 2014-074308 filed on Mar. 31, 2014. The present application likewise claims priority under 35 U.S.C. §119 to Japanese Patent Application No. 2014-074308 filed on Mar. 31, 2014, the entire content of which is also incorporated herein by reference.

TECHNICAL FIELD

The present disclosure relates to a solar cell apparatus including a fixing structure for installing a solar cell module on a roof.

BACKGROUND ART

Conventionally, there have been proposed various fixing structures, roof tiles, etc. that are used to install a solar cell module on a roof. For example, in Patent Literature 1, there is described a support member for supporting on and fixing to a roof a vertical bar member serving as a mount when a solar energy utilizing apparatus is installed. In addition, in Patent Literature 2, there is described a panel-installing roof tile having: a pedestal section for installing an on-roof panel on a surface of the roof tile; and a mounting fixture attached to the pedestal section.

CITATION LIST

Patent Literature

Patent Literature 1: JP 2012-149403A
Patent Literature 2: JP 2010-209583A

SUMMARY OF INVENTION

Technical Problem

It should be noted that in a case where at least two solar cell modules are installed side by side in an eave-ridge direction on a mount fixed onto a roof, rigidity of an entire apparatus including the mount and the solar cell modules is preferably increased in order to increase strength against loads due to wind etc.

Solution to Problem

A solar cell apparatus according to one aspect of the present disclosure is a fixing structure of a solar cell module provided with: the solar cell module that has a solar cell panel, and a module frame provided at a periphery of the solar cell panel; a long mounting frame that is fixed along an eave-ridge direction onto a roof, and has a guide rail section in an upper portion; and a fixing member that is provided by being slid and moved in a longitudinal direction of the mounting frame along the guide rail section, and is fixed at a predetermined position of the mounting frame, in which the module frame is provided with an internal groove section that stores a peripheral portion of the solar cell panel, and an external groove section provided on an opposite side of the solar cell panel. The fixing member has: a base section that engages with the guide rail section; an upright wall section that is provided to stand on the base section; an eave-side insertion section that extends from the upright wall section so as to be inserted into the external groove section of the solar cell module installed on an eave side of the roof; and a ridge-side insertion section that extends from the upright wall section so as to be inserted into the external groove section of the solar cell module installed on a ridge side of the roof.

Advantageous Effect of Invention

According to the solar cell apparatus according to one aspect of the present disclosure, rigidity of the entire apparatus including at least the two solar cell modules and the mounting frame may be increased.

DESCRIPTION OF EMBODIMENT

Hereinafter, an embodiment of the present disclosure will be explained in detail with reference to accompanying drawings. In this explanation, specific shapes, materials, numerical values, directions, etc. are exemplifications for facilitating understanding of the present disclosure, and can be appropriately changed in accordance with applications, objects, specifications, etc. In addition, in a case where a plurality of embodiments or modified examples, etc. are included hereinafter, it is assumed from the beginning that characteristic portions of respective components in the plurality of embodiments or modified examples are appropriately combined and used.

Hereinafter, although a case is explained where two solar cell modules 1a and 1b are installed side by side in an eave-ridge direction, the present disclosure is not limited to this. For example, the present disclosure may be applied to a case where three or more solar cell modules are installed side by side in the eave-ridge direction, or may be applied to a case where a plurality of rows of the solar cell modules in which two or more solar cell modules are installed side by side in the eave-ridge direction are provided in a direction that is perpendicular to or intersects with the eave-ridge direction.

Figure 1:
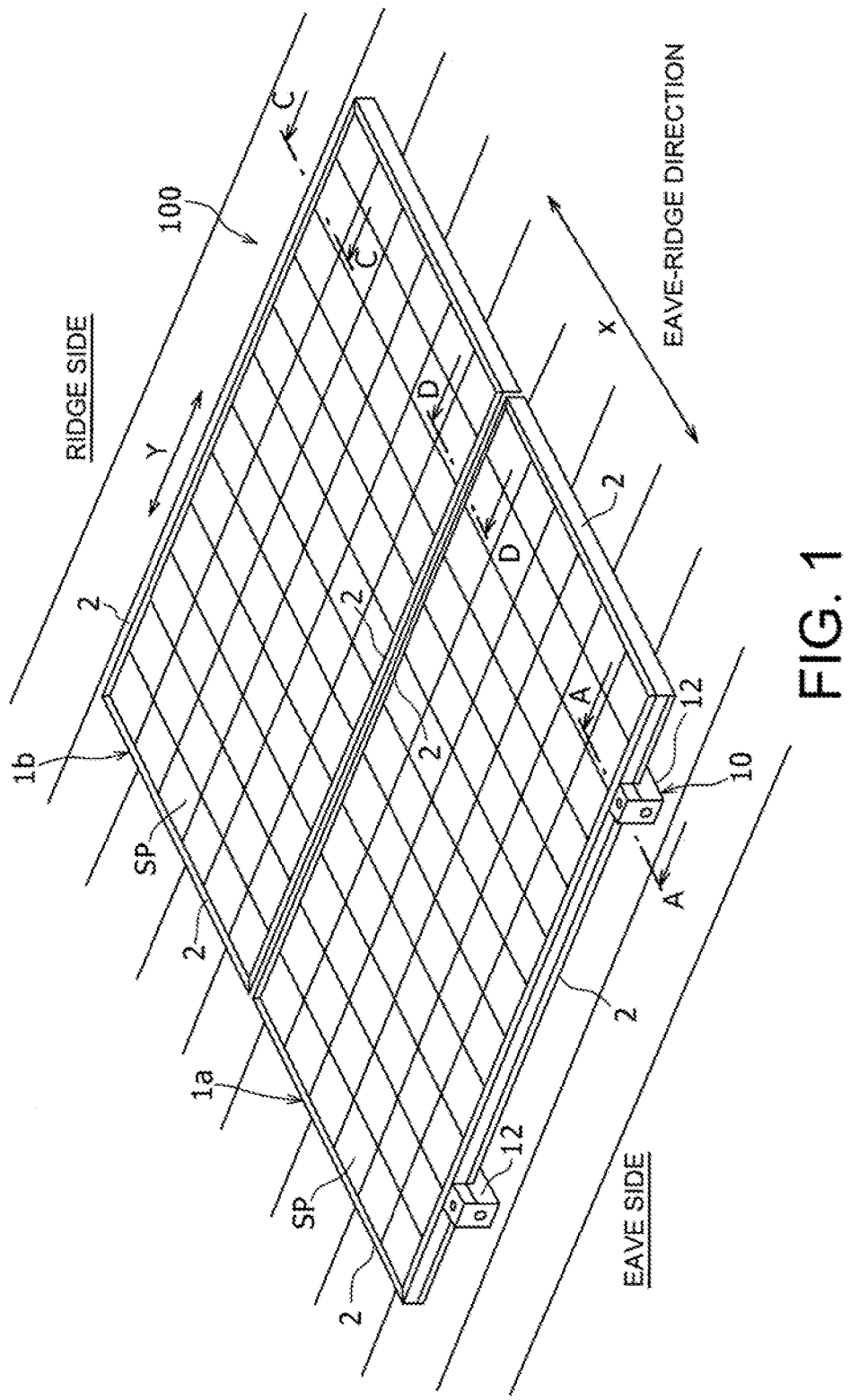
FIG. 1 is a perspective view of a solar cell module installed using a fixing structure of an embodiment of the present disclosure.
Figure 2:
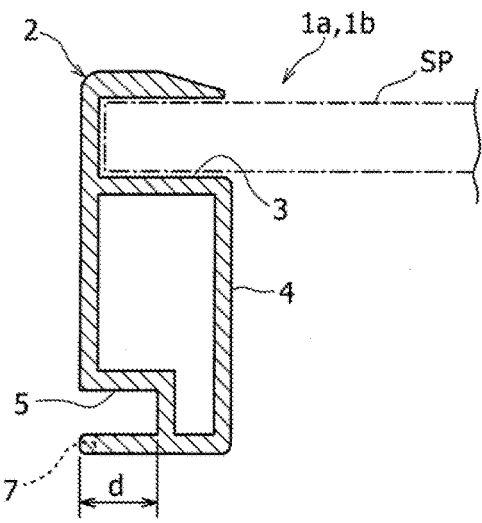
FIG. 2 is a transverse cross-sectional view of a module frame of the solar cell module.

FIG. 1 is a perspective view of the solar cell modules 1a and 1b installed using a fixing structure 10 of the embodiment. FIG. 2 is a transverse cross-sectional view of a module frame 2 provided at peripheral portions of the solar cell modules 1a and 1b. In FIG. 1, an eave-ridge direction of a roof 100 is shown by an arrow X, and a direction perpendicular to the eave-ridge direction is shown by an arrow Y. In addition, in FIG. 1, an upper right side is shown as a "ridge side", a lower left side is as an "eave side", and the roof 100 inclines downwardly from the ridge side toward the eave side.

As shown in FIG. 1, the two solar cell modules 1a and 1b are installed side by side in the eave-ridge direction on the roof 100. The solar cell modules 1a and 1b has: a solar cell panel SP in which a plurality of solar cell elements have been sandwiched by protective members, such as glass plates; and the module frame 2 installed at a periphery of the solar cell panel SP, respectively.

In the embodiment, the solar cell modules 1a and 1b are each formed in a rectangular shape in a plan view. Here, the "plan view" means a direction seen from a direction perpendicular to a light receiving surface of the solar cell panel SP. The solar cell modules 1a and 1b are installed so that short side directions thereof are parallel with the eave-ridge direction. However, the solar cell module may have a shape other than a rectangle in the plan view and, for example, may have another shape, such as a square.

The module frames 2 of the solar cell modules 1a and 1b protect a periphery of the solar cell panel SP, and function as members for attaching a solar cell module 1 to a mounting frame 12 that will be described later. The module frame 2 is, for example, a long member formed by performing extrusion molding of a metal material, such as aluminum. The module frame 2 has a cross-sectional shape with a substantially long rectangular shape in an up-and-down direction as shown in FIG. 2, and an internal groove section 3 that stores a peripheral portion of the solar cell panel SP is formed in an upper portion. The peripheral portion of the solar cell panel SP is inserted into the internal groove section 3, and is fixed with an adhesive etc.

In addition, the module frame 2 has a tubular portion 4 adjacent to the internal groove section 3. Rigidity of the module frame 2 is increased by the tubular portion 4, and weight reduction is achieved by making a part of the module frame 2 as the hollow tubular portion 4. Additionally, in the tubular portion 4 of the module frame 2, an external groove section 5 is formed in a lower portion of a side surface on an opposite side of the solar cell panel SP.

The external groove section 5 is formed extending along a longitudinal direction of the module frame 2. In addition, when the solar cell modules 1a and 1b are assembled, the external groove section 5 is opened facing an opposite side of the solar cell panel SP, i.e. towards the outside of the solar cell modules 1a and 1b. Further, the external groove section 5 is a space into which a projection section, which is an insertion section of a fixing member that will be described later, is inserted, and a depth d of the space is formed to be large enough to be able to completely house the above-described projection section of the fixing member.

Referring to FIG. 1 again, the solar cell modules 1a and 1b are installed on the roof 100, for example, by the two mounting frames 12 included in a part of the fixing structure 10 of the embodiment. The mounting frame 12 is a long member installed along the eave-ridge direction of the roof 100. The solar cell modules 1a and 1b are placed on and fixed to the mounting frames 12 fixed onto the roof 100 with a predetermined interval in an arrow Y direction. A solar cell apparatus includes: the solar cell modules 1a and 1b; the two mounting frames 12; an after-mentioned fixture 20 (FIG. 4 etc.); and an eave-side fixing member 50a (FIG. 6), a ridge-side fixing member 50b (FIG. 9), and an intermediate fixing member 50c (FIG. 11), which are fixing members that will be described later. Note that the roof 100 on which the solar cell modules 1a and 1b are installed may be any of various types of roofs, such as a tiled roof, a slate roof, or a metal-plate roof.

Figure 3A:
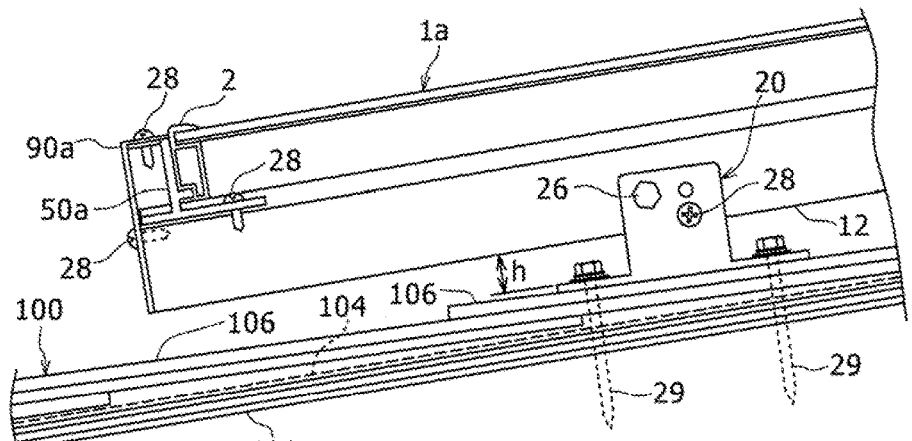
FIG. 3A is a cross-sectional view taken along a line A-A in FIG. 1 in a state where a mounting frame is set at a position separated from a roof.
Figure 3B:
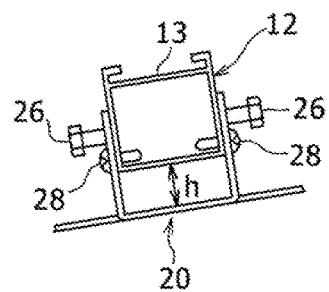
FIG. 3B is a cross-sectional view of the mounting frame of FIG. 3A cut at a flat surface perpendicular to an eave-ridge direction.
Figure 3C:
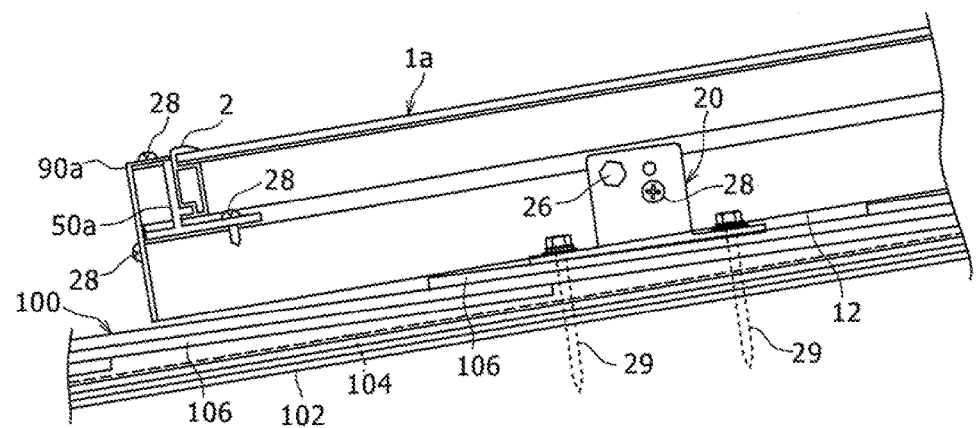
FIG. 3C is a cross-sectional view taken along the line A-A in FIG. 1 in a state where the mounting frame is set at a position close to the roof.
Figure 3D:
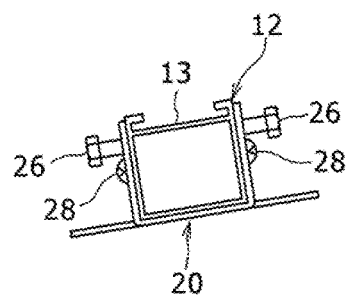
FIG. 3D is a cross-sectional view of the mounting frame of FIG. 3C cut at a flat surface perpendicular to the eave-ridge direction.

FIG. 3A is a cross-sectional view taken along a line A-A in FIG. 1 in a state where the mounting frame 12 is set at a position separated from a surface of the roof 100, and shows an eave-side end of the solar cell module 1a installed on the eave side of the roof 100. In addition, FIG. 3B is a cross-sectional view of the mounting frame 12 of FIG. 3A cut at a flat surface perpendicular to the eave-ridge direction. In addition, FIG. 3C is a cross-sectional view taken along the line A-A in FIG. 1 in a state where the mounting frame 12 is set at a position close to the surface of the roof 100. FIG. 3D is a cross-sectional view of the mounting frame 12 of FIG. 3C cut at a flat surface perpendicular to the eave-ridge direction.

As shown in FIGS. 3A, 3B, 3C, and 3D, the roof 100 is configured such that a tarpaulin 104, such as asphalt roofing is laid on a roofing plate 102, which is a roof base material of a house, and such that a number of roof materials 106, such as a slate material, are stacked on the tarpaulin 104 so as to form steps.

In addition, the mounting frame 12 is fixed to the roof 100 by the fixture 20 formed of a metal plate, such as an iron plate, a stainless steel plate, or a steel plate. The fixture 20 is fixed onto the surface of the roof 100, i.e. the roof material 106, by a wood screw 29.

Figure 4:
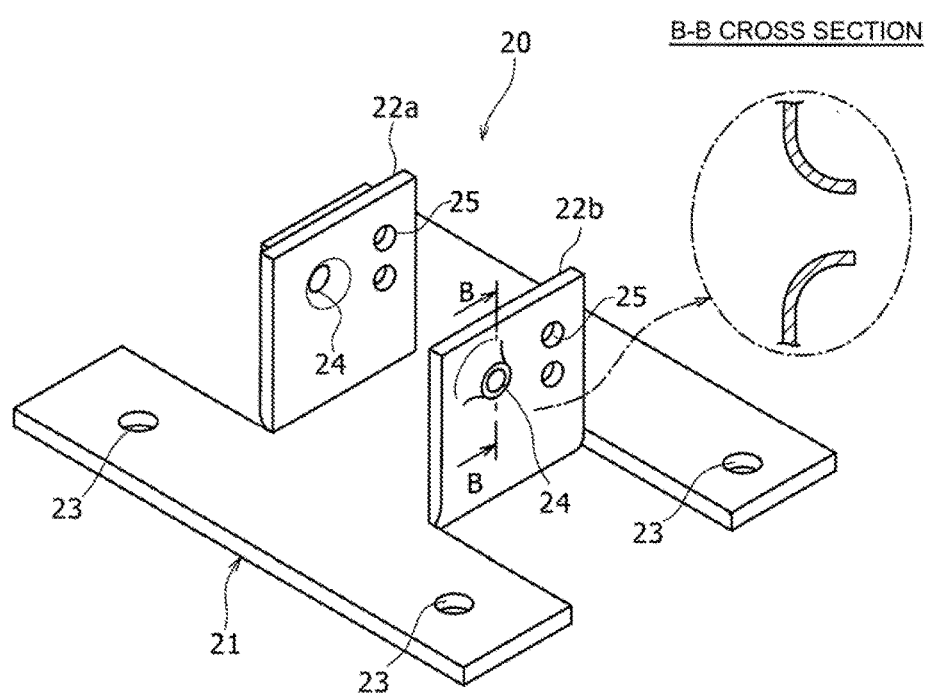
FIG. 4 shows a perspective view of a fixture, and a partial enlarged cross-sectional view thereof.

FIG. 4 shows a perspective view of the fixture 20, and a partially enlarged cross-sectional view thereof. The fixture 20 has: a base plate 21 formed in a substantially H shape in the plan view; and a pair of support sections 22a and 22b provided to stand on the base plate 21. Four screw insertion holes 23 are formed in four corners of the base plate 21. The wood screws 29 are screwed into and are made to penetrate the roofing plate 102 from the screw insertion holes 23, and the fixture 20 is thereby fixed to the roof 100.

In addition, four notches are formed in one metal plate, portions partitioned by the notches are folded substantially at a right angle to the base plate 21, and the pair of support sections 22a and 22b of the fixture 20 are thereby integrally configured. As described above, the fixture 20 is integrally formed of the one metal plate, and as a result manufacturing becomes easy and cost reduction can be achieved.

In the fixture 20, the pair of support sections 22a and 22b are opposed to each other with an interval therebetween substantially corresponding to a width w1 (refer to FIG. 5) of the mounting frame 12. In more detail, the interval between the pair of support sections 22a and 22b is formed to be a little larger than the width w1 of the mounting frame 12. The mounting frame 12 can therefore be inserted and arranged between the pair of support sections 22a and 22b.

One female screw hole 24 and two through holes 25 are formed in the support sections 22a and 22b of the fixture 20, respectively. The female screw hole 24 is, as shown in a cross-sectional view taken along a line B-B in FIG. 4, for example, a female screw threaded in an inner peripheral surface of a through hole formed to bulged outwards, for example, in a truncated cone shape by performing burring. The female screw hole 24 is formed as described above, and as a result the female screw can be formed accurately and reliably even in a case where a thin metal plate is used for the fixture 20. However, since the female screw hole 24 is a hole into which a temporary fixing bolt of the mounting frame 12 is screwed, as will be described later, high fastening strength is not required. Accordingly, if a female screw groove can be formed in a plate thickness of the metal plate included in the fixture 20, the female screw may be threaded in an inner periphery corresponding to the plate thickness of the through hole without performing burring.

In addition, the two through holes 25 formed in the support sections 22a and 22b of the fixture 20 are formed in the up-and-down direction separated from each other by a predetermined distance. A screw, such as a drill screw, is inserted into one of the through holes 25 to be made to penetrate a side surface of the mounting frame 12, and the mounting frame 12 is thereby fixed to the support sections 22a and 22b of the fixture 20.

Note that although the two through holes 25 are formed in the support sections 22a and 22b, respectively, in the embodiment, the present disclosure is not limited to this, and only one through hole 25 may be formed in the support sections 22a and 22b, or the through hole 25 may be formed in only one of the support sections 22a and 22b. In addition, from a viewpoint of ease of processing, the female screw hole 24 and the through hole 25 are preferably previously formed in the flat metal plate before the support sections 22a and 22b are folded and formed to the base plate 21.

Figure 5:
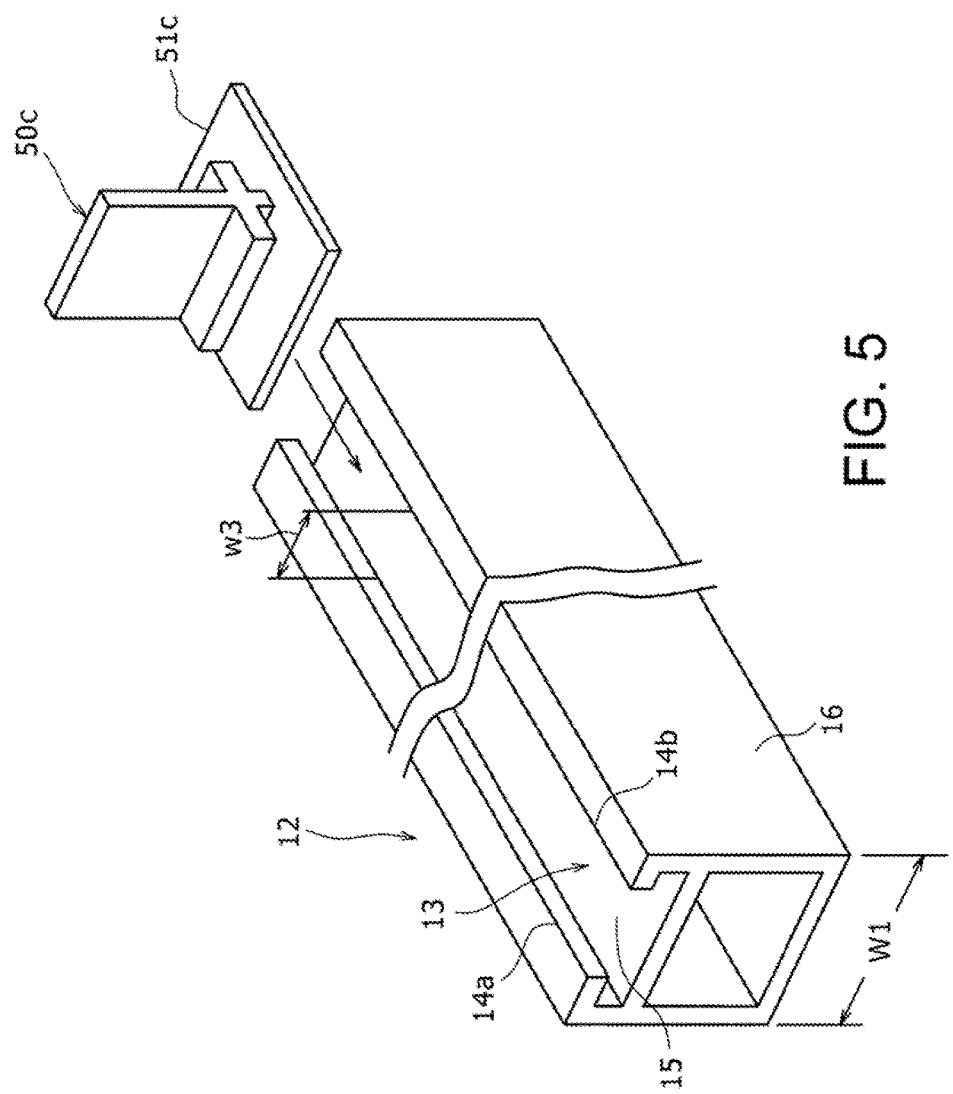
FIG. 5 is a perspective view of the mounting frame.

FIG. 5 is a perspective view showing the mounting frame 12. The mounting frame 12 is a long member on which the solar cell modules 1a and 1b are placed, and that supports them. The mounting frame 12 is fixed to the roof 100 by the fixture 20 as mentioned above. In addition, the mounting frame 12 is, for example, preferably formed by performing extrusion molding of aluminum, or a metal plate may be continuously bent by roll forming etc. to thereby form a long member.

The mounting frame 12 has a tubular portion 16, for example, having a substantially rectangular transverse cross section and end surface shape. The mounting frame 12 is formed in a tubular shape, as described above, and therefore has an advantage in which rigidity of the mounting frame 12 is increased. In addition, a guide rail section 13 is formed in an upper portion of the mounting frame 12. The guide rail section 13 includes: protrusion parts 14a and 14b that protrude in a substantially horizontal direction from both sides of the mounting frame 12 in a width direction; and a rail bottom surface 15 corresponding to an upper wall of the tubular portion 16. Additionally, the guide rail section 13 is opened between the protrusion parts 14a and 14b, and is opened at both ends of the mounting frame 12 in the longitudinal direction. As a result, as shown in FIG. 5, both side edges of a base section 51c of the intermediate fixing member 50c can be slid and moved in the longitudinal direction of the mounting frame 12 in a state of being engaged with the guide rail section 13. Note that details of the intermediate fixing member 50c will be described later.

Figure 6:
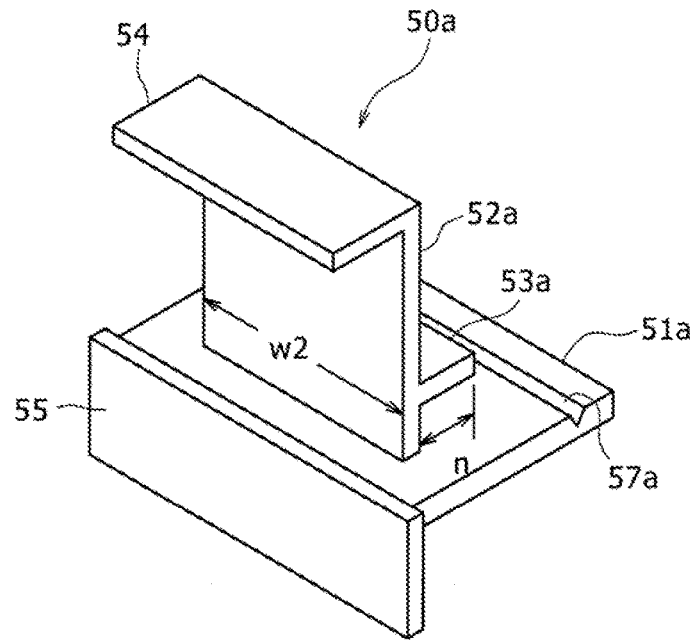
FIG. 6 is a perspective view of an eave-side fixing member.

FIG. 6 is a perspective view of the eave-side fixing member 50a. The eave-side fixing member 50a is attached to an eave-side end of the mounting frame 12 by a drill screw 28 as shown in FIGS. 3A and 3C. The eave-side fixing member 50a is provided with: a base section 51a; an upright wall section 52a; a projection section 53a; an upper-end wall section 54; and a side wall section 55 as shown in FIG. 6. The eave-side fixing member 50a is preferably integrally formed by a metal material, such as aluminum.

The base section 51a is a portion inserted into the guide rail section 13 from the eave-side end of the mounting frame 12, and is formed in a plate shape. For example, a V-shaped groove 57a for facilitating positioning of a tip of the drill screw 28 is preferably formed in the base section 51a. The upright wall section 52a is provided to stand substantially vertically on the base section 51a. A width w2 of the upright wall section 52 is formed narrower than a width w3 (FIG. 5) of an upper opening of the guide rail section 13, and it is configured so as not to interfere with the respective protrusion parts 14a and 14b of the guide rail section 13.

The projection section 53a is provided in a projecting manner on one side surface (i.e. a side directed to the ridge side in an attached state) in the upright wall section 52a of the eave-side fixing member 50a. The projection section 53a is a portion that is inserted into the external groove section 5 formed in the module frame 2 of the solar cell module 1a installed on the eave side, and positions and supports the solar cell module 1a together with the upright wall section 52a. A projection length n of the projection section 53a from the upright wall section 52a is formed shorter than the above-described depth d (refer to FIG. 2) of the external groove section 5 of the module frame 2. As a result, the projection section 53a can be inserted into the above-described external groove section 5 until the upright wall section 52 becomes a state of being in contact with the module frame 2.

The upper-end wall section 54 is continuously installed so as to be bent at a right angle to the upright wall section 52a in an upper end of the upright wall section 52a, and is formed parallel with the base section 51a, and extending on an opposite side of the projection section 53a. The upper-end wall section 54 is a portion to which an eave-side cover member 90a that will be described later is fixed by the drill screw 28 in a state where the eave-side fixing member 50a is attached to the mounting frame 12. The side wall section 55 has a function to abut against an end surface of the mounting frame 12 to thereby position the eave-side fixing member 50a, and is a portion to which the eave-side cover member 90a is fixed by the drill screw 28 (refer to FIGS. 3A and 3C).

Figure 7:
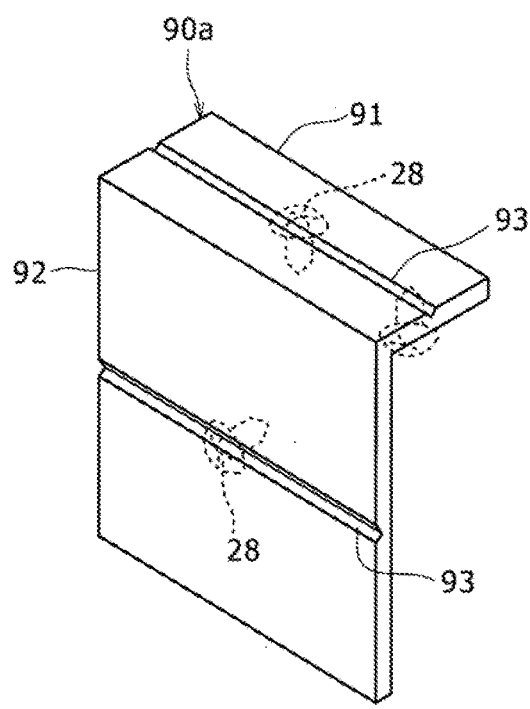
FIG. 7 is a perspective view of an eave-side cover member.

FIG. 7 is a perspective view of the cave-side cover member 90a. The cave-side cover member 90a is a member in which an upper-end wall section 91 and a side wall section 92 have been integrated to be formed in an L shape. In addition, the eave-side cover member 90a, for example, preferably includes resin. Further, the eave-side cover member 90a is fixed to the eave-side fixing member 50a by the drill screw 28 as mentioned above, and is attached covering the eave-side fixing member 50a and the end surface of the mounting frame 12. Note that in the upper-end wall section 91 and the side wall section 92, for example, a V-shaped groove 93 for easily positioning the tip of the drill screw 28 is preferably formed extending in a lateral direction.

Figure 8:
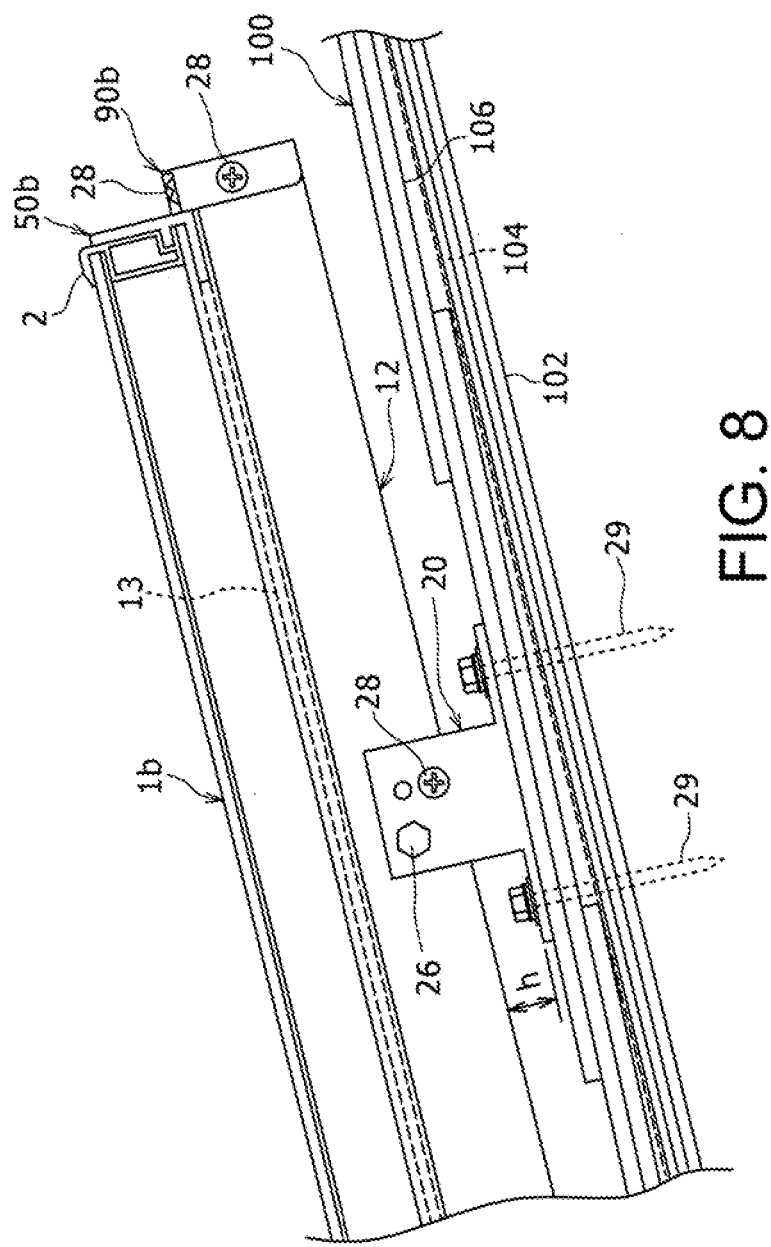
FIG. 8 is a cross-sectional view taken along a line C-C in FIG. 1.

FIG. 8 is a cross-sectional view taken along a line C-C in FIG. 1, and shows the solar cell module 1b and a ridge-side end of the mounting frame 12. The mounting frame 12 is fixed to and supported by the fixture 20 fixed to the roof 100. In addition, a ridge-side cover member 90b is fixed to the ridge-side end of the mounting frame 12 by the drill screw 28. Here, the same symbols are given to the roof 100, the fixture 20, the mounting frame 12, and the solar cell module 1b mentioned above with reference to FIG. 3 etc., and duplicated explanation thereof is not given.

Figure 9:
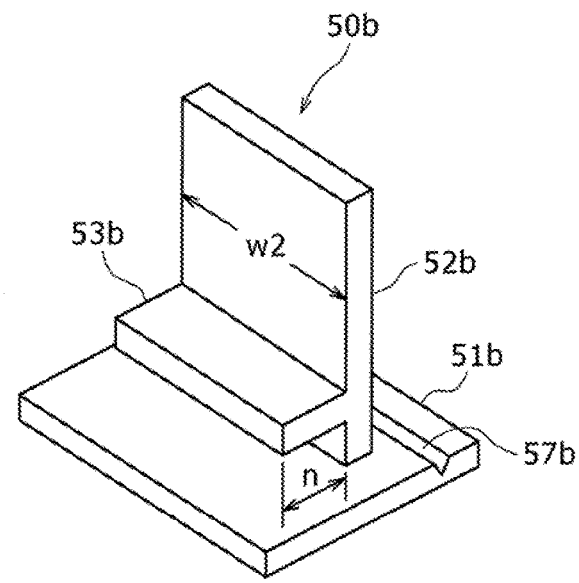
FIG. 9 is a perspective view of a ridge-side fixing member.

As shown in FIG. 8, the ridge-side fixing member 50b is fixed to the ridge-side end of the mounting frame 12, for example, by the drill screw 28. FIG. 9 is a perspective view of the ridge-side fixing member 50b. The ridge-side fixing member 50b is provided with: the base section 51b; the upright wall section 52b; and the projection section 53b. The ridge-side fixing member 50b has a configuration substantially similar to the eave-side fixing member 50a explained with reference to FIG. 6. However, a point where the ridge-side fixing member 50b does not have an upper-end wall section and a side wall section, and a projection direction of the projection section 53b (i.e. the direction in which the projection section 53b projects from the upright wall section 52b toward the eave side) are different from the configuration of the cave-side fixing member 50a. A symbol (a suffix is changed from "a" to "b") corresponding to the eave-side fixing member 50a is given to each section of the ridge-side fixing member 50b, and detailed explanation thereof is omitted.

Figure 10:
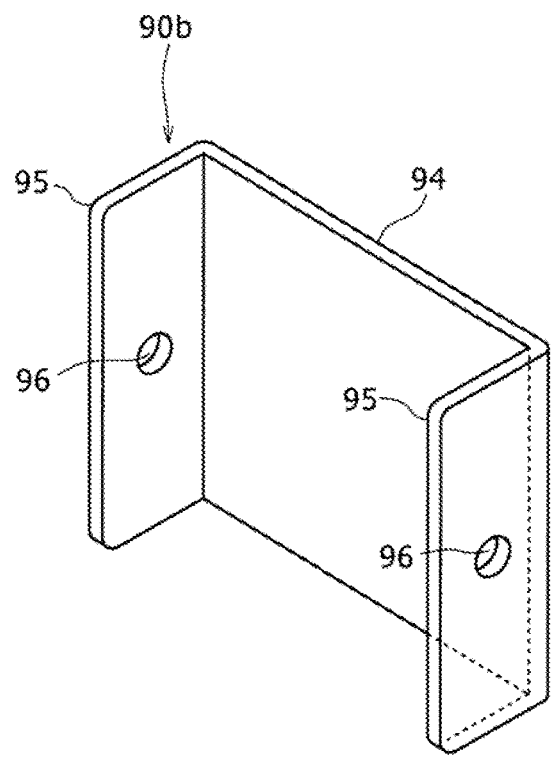
FIG. 10 is a perspective view of a ridge-side cover member.

FIG. 10 is a perspective view of the ridge-side cover member 90b. The ridge-side cover member 90b is provided with: a flat plate section 94 provided covering the end surface of the mounting frame 12 in the longitudinal direction; and a side wall section 95 continuously installed to be bent substantially at a right angle from both ends of the flat plate section 94. The ridge-side cover member 90b is a substantially U-shaped member having two right-angled bending sections. A through hole 96 for inserting the drill screw 28 is formed in each side wall section 95. The drill screw 28 is screwed into both side surfaces of the mounting frame 12 in the width direction from the through hole 96, and as a result the ridge-side cover member 90b is fixed to the mounting frame 12. An opening of the guide rail section 13 formed in the end surface of the mounting frame 12 in the longitudinal direction is therefore blocked by the ridge-side cover member 90b, and the ridge-side fixing member 50b is prevented from detaching from the mounting frame 12.

Figure 11:
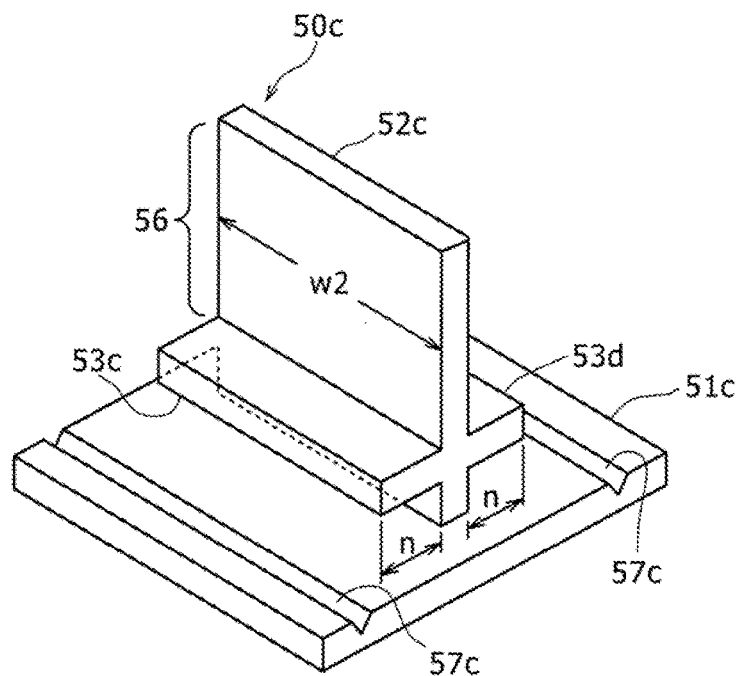
FIG. 11 is a perspective view of an intermediate fixing member.

Next, configurations of the solar cell modules 1a and 1b, and the intermediate fixing member 50c arranged therebetween will be explained with reference to FIGS. 11 and 12.

FIG. 1 is a perspective view of the intermediate fixing member 50c. The intermediate fixing member 50c has: the base section 51c slidably engaged with the guide rail section 13 of the mounting frame 12; and an upright wall section 52c provided to vertically stand on the base section 51c. This point is the same as the above-mentioned eave-side fixing member 50a and ridge-side fixing member 50b.

For example, a V-shaped groove 57c for facilitating positioning of the tip of the drill screw 28 is preferably formed in the base section 51c of the intermediate fixing member 50c. The groove 57c is formed along a direction perpendicular to the longitudinal direction of the mounting frame 12, i.e. a direction perpendicular to a slide movement direction of the intermediate fixing member 50c.

A first projection section (an eave-side projection section) 53c, which is an eave-side insertion section, and a second projection section (a ridge-side projection section) 53d, which is a ridge-side insertion section, are provided in a projecting manner at the upright wall section 52c of the intermediate fixing member 50c. In more detail, when the intermediate fixing member 50c is assembled to the mounting frame 12, the first projection section 53c is formed at one side surface of the upright wall section 52c facing the eave side (i.e. a solar cell module 1a side) so as to extend from the upright wall section 52c. In addition, the second projection section 53d is formed at the other side surface of the upright wall section 52c facing the ridge side (i.e. a solar cell module 1b side) so as to extend from the upright wall section 52c.

Each of the projection sections 53c and 53d is formed to have the same shape and size. Namely, each of the projection sections 53c and 53d, for example, has a rectangular cross section (and rectangular side surfaces), and is formed to have the projection length n from the upright wall section 52c. These shapes and sizes are the same as those of each of the projection sections 53a and 53b of the above-mentioned eave-side fixing member 50a and ridge-side fixing member 50b.

Figure 12:
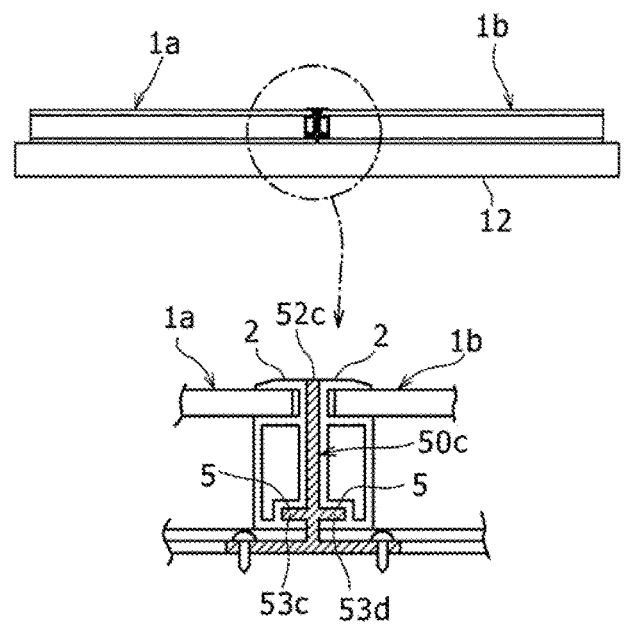
FIG. 12 is a cross-sectional view taken along a line D-D in FIG. 1.

FIG. 12 is a cross-sectional view taken along a line D-D in FIG. 1. As shown in FIG. 11, a portion extending above each of the projection sections 53c and 53d formed to have the same height to the base section 51c in the upright wall section 52c of the intermediate fixing member 50c serves as a flat upper-side wall section 56. When the two solar cell modules 1a and 1b are installed on the mounting frame 12, the upper-side wall section 56 serves as a portion sandwiched by the module frames 2 of the respective solar cell modules 1a and 1b. A position of an upper end surface of the upper-side wall section 56 is set to be substantially flush with an upper surface of the adjacent module frame 2 when the upper-side wall section 56 is sandwiched between the two solar cell modules 1a and 1b. As described above, the upper end surface of the upper-side wall section 56 becomes substantially flush with the module frame 2, and a groove is therefore not formed between the two solar cell modules 1a and 1b installed as will be described later, which can contribute to increasing the rigidity of the apparatus including the solar cell modules 1a and 1b.

Figure 13:
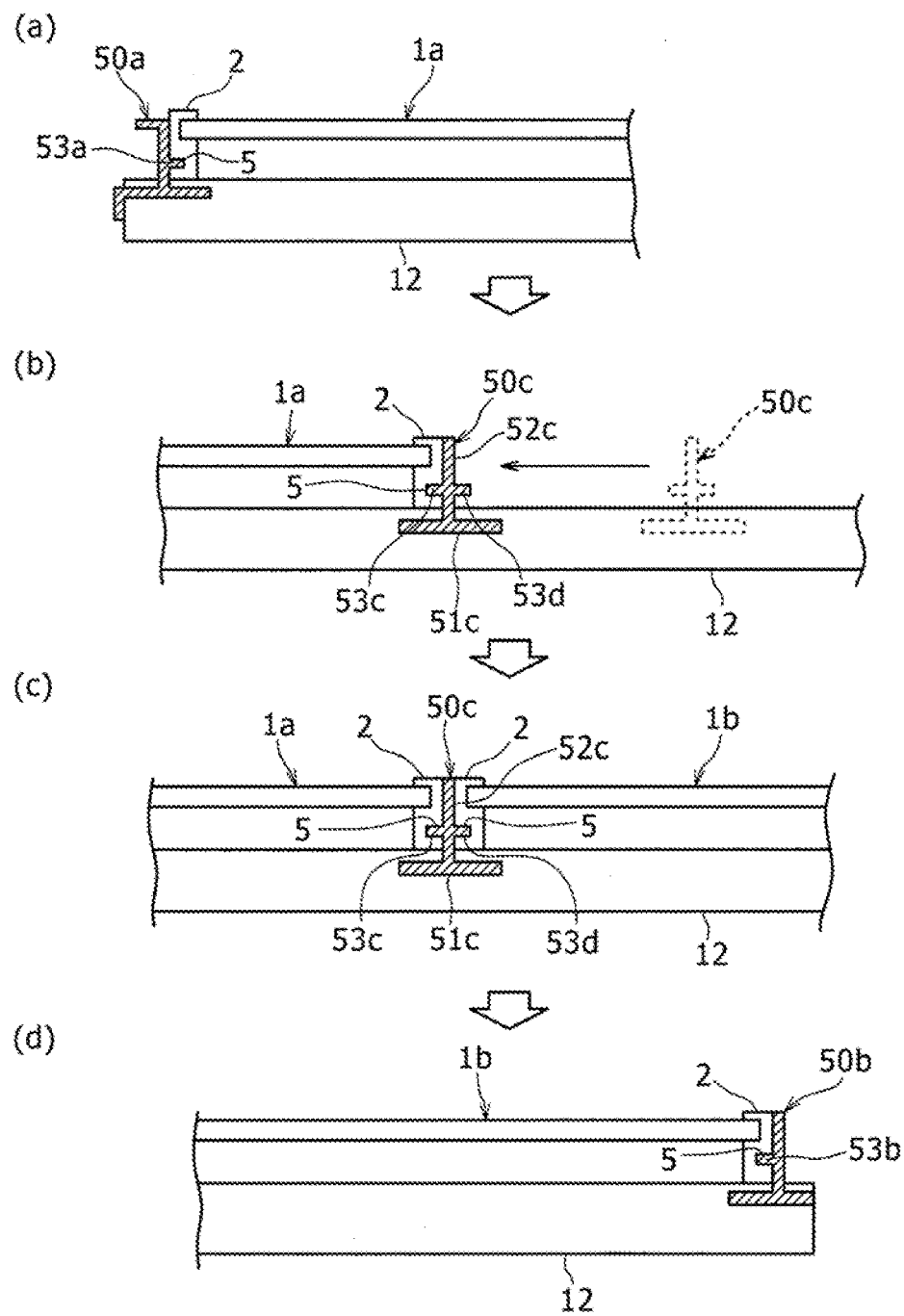
FIG. 13 is a view showing work procedures when the solar cell module is installed on the mounting frame.

Work procedures at the time of fixing the solar cell modules 1a and 1b to the mounting frame 12 using the respective fixing members 50a, 50b, and 50c including the above-described intermediate fixing member 50c will now be explained with reference to FIG. 13. In FIG. 13, there are shown the work procedures from a state where the mounting frame 12 has already been fixed to the roof 100 by the fixture 20. In FIG. 13, a left side is an eave side, a right side is a ridge side, and the mounting frame 12 and the solar cell modules 1a and 1b are shown as horizontal attitudes in order to make the drawing easier to understand.

First, as shown in FIG. 13(a), the eave-side fixing member 50a is fixed to the eave-side end of the mounting frame 12. Specifically, the eave-side fixing member 50a is fixed to the mounting frame 12 by the drill screw 28. The solar cell module 1a installed on the eave side is then placed on the mounting frame 12 in this state, and the projection section 53 of the eave-side fixing member 50a is inserted into the external groove section 5 of the module frame 2. As a result, positioning of the solar cell module 1a is performed.

Subsequently, as shown in FIG. 13(b), the intermediate fixing member 50c inserted into the guide rail section 13 is slid and moved from the ridge-side end of the mounting frame 12. The first projection section 53c of the intermediate fixing member 50c is then arranged in a state of being inserted into the external groove section 5 formed in the module frame 2 of the solar cell module 1a. In this state, the intermediate fixing member 50c is fixed to the mounting frame 12 by the drill screw 28. In addition, the eave-side cover member 90a may also be fixed to the mounting frame 12 by the drill screw 28 at this time. The solar cell module 1a is thus fixed onto the mounting frame 12 by the fixing members 50a and 50c.

Next, as shown in FIG. 13(c), the solar cell module 1b installed on the ridge side is placed on the mounting frame 12, and the second projection section 53d of the intermediate fixing member 50c is inserted into the external groove section 5 of the eave-side module frame 2. The ridge-side solar cell module 1b is thereby positioned on the mounting frame 12. At this time, the intermediate fixing member 50c is in a state of being sandwiched between the respective module frames 2 of the two solar cell modules 1a and 1b substantially without a gap.

After that, as shown in FIG. 13(d), the ridge-side fixing member 50b is inserted into and arranged at the ridge-side end of the mounting frame 12, and the projection section 53b is assembled in a state of being inserted into the external groove section 5 of the module frame 2 of the solar cell module 1b. The ridge-side fixing member 50b is then fixed to the mounting frame 12 by the drill screw 28 in this state. The solar cell module 1b is thus fixed to the mounting frame 12.

Additionally, finally, the ridge-side cover member 90b is fixed to the mounting frame 12 by the drill screw 28. Installation work of the solar cell modules 1a and 1b is thus completed.

A configuration to fix the mounting frame 12 onto the roof 100 will be explained with reference to FIGS. 14 and 15. FIGS. 14(a) and 14(b) are views showing where the mounting frame 12 is temporarily fixed to the fixture 20. As shown in FIGS. 14A and 14B, the mounting frame 12 is inserted and arranged from the upper side between the support sections 22a and 22b of the fixture 20 fixed onto the roof 100. Two bolts 26 are then screwed into the female screw holes 24 formed in the support sections 22a and 22b, and tips of the bolts 26 are pressed against the side walls of the mounting frame 12. The mounting frame 12 is thereby temporarily fixed to the fixture 20. In this state, for example, the drill screws 28 inserted into the through holes 25 (refer to FIG. 4) of the support sections 22a and 22b penetrate the side walls of the mounting frame 12. Thereby, the mounting frame 12 is fixed to the fixture 20.

Figure 14:
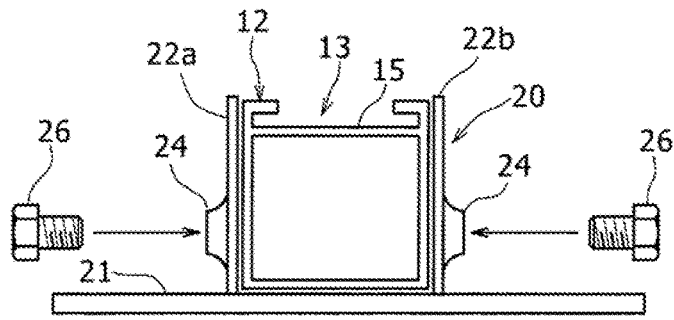
FIG. 14 is a view showing that the mounting frame is temporarily fixed to the fixture.
Figure 14:
Figure 14:
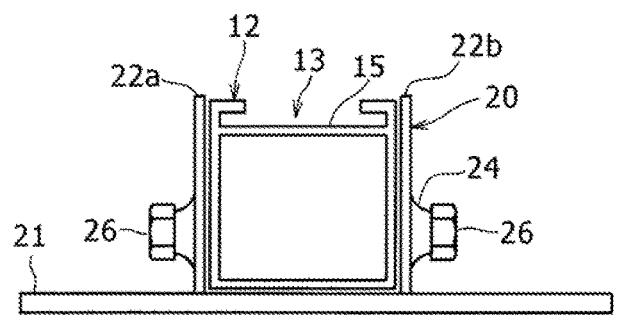

Here, although a bottom surface of the mounting frame 12 is shown to be in contact with the base plate 21 of the fixture 20 in FIG. 14, height adjustment of the mounting frame 12 may be needed in order to deal with unevenness of the surface of the roof 100. In that case, the mounting frame 12 is temporarily fastened at a position where a desired gap h (refer to FIGS. 3A and 3B) is formed between the bottom surface of the mounting frame 12 and the base plate 21 of the fixture 20, and the mounting frame 12 can be fixed using the drill screw 28 in this state.

Figure 15A:
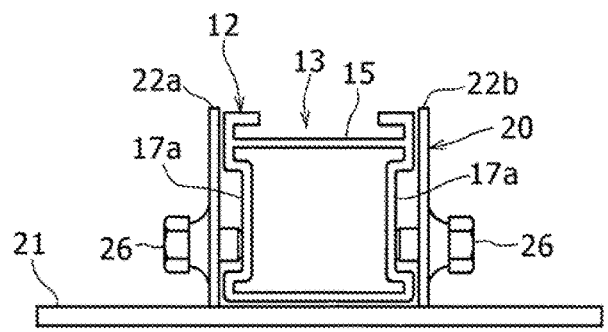
FIG. 15A is a view showing a transverse cross section of the mounting frame in which height-adjusting concave portions have been formed in side surfaces.
Figure 15B:
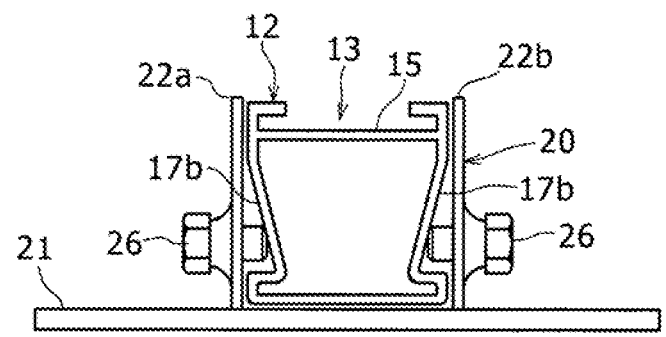
FIG. 15B is a view showing a transverse cross section of the mounting frame in which height-adjusting concave portions have been formed in the side surfaces.

FIGS. 15A and 15B are views each showing a transverse cross section of the mounting frame 12 in which height-adjusting concave portions have been formed in the side surfaces. As shown in FIG. 15A, concave portions 17a that are long in the up-and-down direction are formed in both side surfaces of the mounting frame 12 in the width direction, and the tips of the bolts 26 may be engaged with the concave portions 17a. In the manner as described above, it becomes clear that height adjustment can be performed by an extended length of the concave portion 17a. In addition, as shown in FIG. 15B, concave portions 17b formed in the side surfaces of the mounting frame 12 may be formed so as to incline in a tapered shape toward a frame lower portion. In the manner as described above, when fastening degrees of the bolts 26 are increased, the mounting frame 12 is lifted by the bolt tips that abut against a tapered surface, and as a result, fine adjustment of a height position of the mounting frame 12 can be performed.

Note that in the above-described FIGS. 14, 15A, and 15B, the case has been explained where the mounting frame 12 is inserted between the support sections 22a and 22b of the fixture 20, and where the tips of the two bolts 26 are pressed against and are temporarily fixed to both side surfaces of the mounting frame 12 in the width direction from the outsides of the two support sections 22a and 22b. Meanwhile, such a configuration may be employed where although the female screw hole 24 and the through hole 25 are formed in the one support section 22a (or 22b) of the two support sections 22a and 22b, the through hole 25 is formed in the other support section 22b (or 22a), and the female screw hole 24 is not formed therein. With this configuration, the bolt 26 is screwed into the female screw hole 24 of the one support section 22a, and the tip of the bolt 26 is pressed against the one side surface of the mounting frame 12 in the width direction. The other side surface of the mounting frame 12 in the width direction is thereby pressed against an internal surface of the other support section 22b. The mounting frame 12 is then sandwiched by the tip of the bolt 26 screwed into the one support section 22a and the other support section 22b, and is temporarily fixed. As a result, using only the one bolt 26 screwed into the one support section 22a as the bolt 26, the mounting frame 12 is temporarily fixed to the fixture 20, the bolt 26 is further unfastened from this state, and height adjustment to move the mounting frame 12 in a height direction can be performed.

Next, differences with a comparative example will be explained mainly with reference to FIGS. 12, 16, 4, and 17. FIG. 12 is a cross-sectional view taken along a line D-D in FIG. 1, and FIG. 16 is a view showing a fixing member in a fixing structure of the comparative example.

Figure 16:
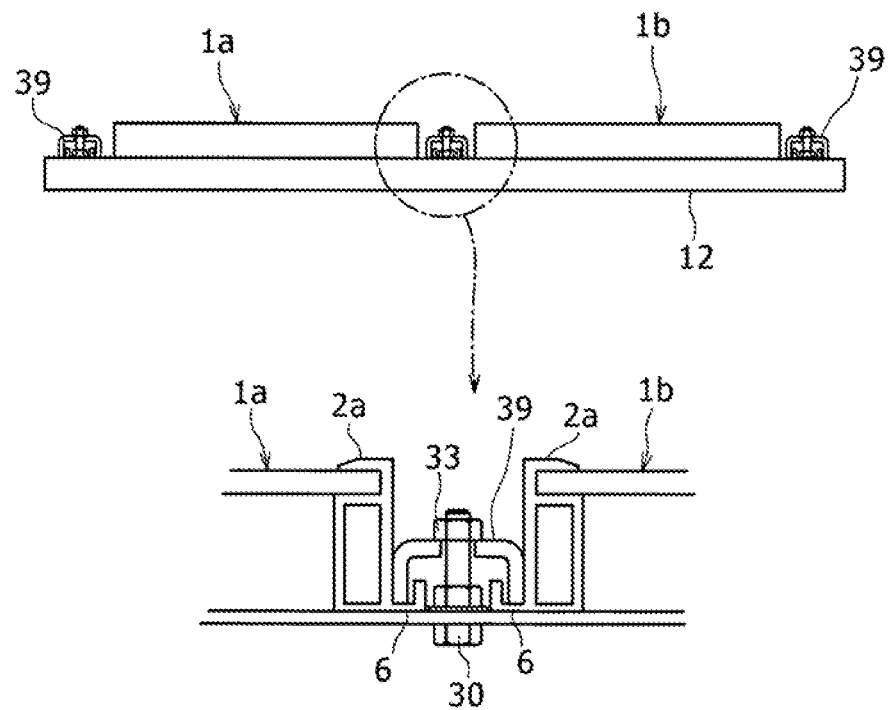
FIG. 16 is a view showing a fixing member in a fixing structure of a comparative example.

First, referring to FIG. 16, flange sections 6 that are formed in a substantially L shape and project outside (i.e. an opposite side of the solar cell panel SP) are formed at lower portions of the module frames 2 of the two solar cell modules 1a and 1b. Additionally, a pressing metal fitting 39 that presses the flange sections 6 from the upper side is fastened by a bolt 30 and a nut 33, and the solar cell modules 1a and 1b are fixed to the mounting frame 12. In this case, since a gap corresponding to a width dimension (i.e. a size of the mounting frame 12 in the longitudinal direction) of the pressing metal fitting 39 is formed between the two solar cell modules 1a and 1b, the mounting frame 12 by and to which the solar cell modules 1a and 1b are supported and fixed need to have high rigidity.

In contrast with this, as shown in FIG. 12, according to the fixing structure of the embodiment, the intermediate fixing member 50c is fixed in a state of being sandwiched by the two solar cell modules 1a and 1b substantially without the gap. In this case, the solar cell apparatus including the mounting frame 12, the intermediate fixing member 50c, and the solar cell modules 1a and 1b can be regarded as an integrated rigid structure. Accordingly, since rigidity of the entire solar cell apparatus can be increased, the mounting frame 12 can be accordingly made thinner to reduce its rigidity. As a result, material cost reduction and weight reduction of the mounting frame 12 can be achieved.

In addition, in the fixing structure of the embodiment, as is apparent by comparing FIG. 12 with FIG. 16, a length of the mounting frame 12 can be made shorter compared with the comparative example using the pressing metal fitting 39. Accordingly, material cost reduction and weight reduction of the mounting frame 12 can also be achieved by the shorter length of the mounting frame 12, and ease of loading at the time of conveyance can also be improved.

Further, in the fixing structure of the embodiment, the bolt 30 and the nut 33 to fix the pressing metal fitting 39 used in the comparative example can be made unnecessary, and special nuts 35 (refer to FIG. 17) used to temporarily fix the mounting frame 12 to a fixture 20a can also be made unnecessary. Therefore, since component part costs can be reduced, and the solar cell modules 1a and 1b can be installed without using these bolts and nuts, ease of construction becomes good.

Wind may get into between the roof 100 and the solar cell module 1. At this time, a force acts on the solar cell module 1 to separate it from the roof 100. In the fixing structure of the embodiment, the eave-side fixing member 50a, the ridge-side fixing member 50b, and the projection section 53 provided at the intermediate fixing member 50c are inserted into the external groove section 5 of the solar cell module 1. The base section 51 provided at the eave-side fixing member 50a, the ridge-side fixing member 50b, and the intermediate fixing member 50c is inserted into and engaged with the guide rail section 13 of the mounting frame 12. Therefore, even in a case where wind gets into between the roof 100 and the solar cell module 1 depending on structures of the solar cell module 1, the fixing member 50, and the mounting frame 12, the solar cell module 1 can be firmly fixed to the roof 100.

Figure 17:
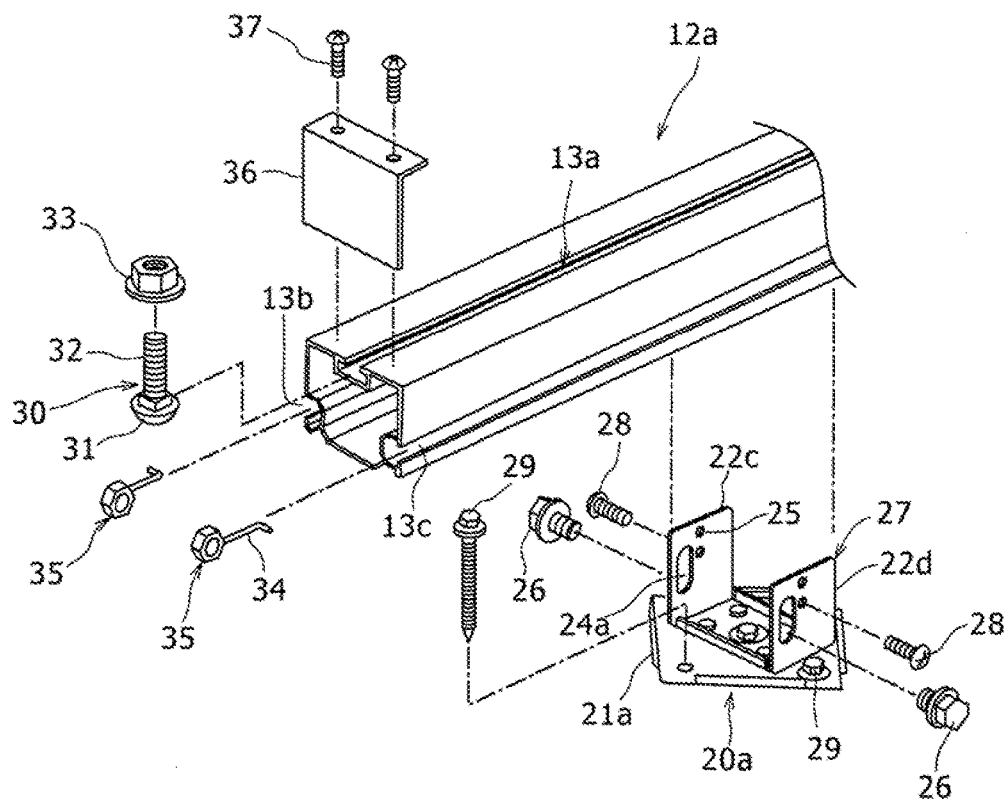
FIG. 17 is an exploded perspective view showing one example of a mounting frame and a fixture of the comparative example.

FIG. 17 is an exploded perspective view showing one example of a mounting frame 12a and the fixture 20a of the comparative example. In an upper portion of the mounting frame 12a, a guide rail section 13a through which a head 31 of the bolt 30 is slidably passed is formed along a longitudinal direction. When the head 31 of the bolt 30 is inserted into and arranged at the guide rail section 13a from a frame end, a shank 32 of the bolt 30 becomes a state of projecting upwardly from the guide rail section 13a. The pressing metal fitting 39 (refer to FIG. 16) formed in a substantially U shape is fixed to the shank 32 by the nut 33. The comparative example is configured such that the flange sections formed in a projecting manner at a lower edge of the module frame of the solar cell module are pressed against the mounting frame 12a by the pressing metal fitting 39, and such that the solar cell module is thereby fixed to the mounting frame (refer to FIG. 16).

In addition, the mounting frame 12a has guide rail sections 13b and 13c also on both side walls in a width direction. The nut 35 to which an operation pin 34 bent in an L shape is coupled is slidably inserted into and arranged at the guide rail sections 13b and 13c, respectively. The nut 35 is screwed with the bolt 26 to temporarily fix the mounting frame 12a to the fixture 20a. When the guide rail sections 13b and 13c are inserted and arranged from the frame end, tips of the operation pins 34 of the nuts 35 becomes a state of projecting from the side surfaces of the mounting frame 12a. The comparative example is configured such that the nut 35 is moved to a predetermined fixed position along the longitudinal direction of the mounting frame 12a while a worker holds the projecting operation pin 34 with their fingers etc.

Note that this is similar to the embodiment in which the bolt 26 is used to temporarily fasten the mounting frame 12a to the fixture 20a, and the drill screw 28 is used for actual fixing.

The fixture 20a includes: a base plate 21a formed of a substantially square metal plate; and a support member 27 fixed to the base plate 21a by means such as welding and screwing. The support member 27 is formed by a metal plate being folded in a substantially channel shape, and has a pair of support sections 22c and 22d. Additionally, one long hole 24a extending in an up-and-down direction, and the two through holes 25 for the drill screws 28 formed side by side in the up-and-down direction are formed in the respective support sections 22c and 22d.

Note that a cover member 36 bent in an L shape is attached to an end of the mounting frame 12a by a drill screw 37. The cover member 36 is provided so as to close openings of frame ends of the respective guide rail sections 13a, 13b, and 13c after insertion of the bolt 30 into the guide rail section 13a, and insertion of the nuts 35 into the guide rail sections 13b and 13c are completed.

While the fixture 20a is configured by the two members being coupled to each other in a configuration of the comparative example configured as described above, the fixture 20 of the embodiment is integrally formed of one metal plate as mentioned above with reference to FIG. 4. Accordingly, manufacturing of the fixture 20 of the embodiment becomes easy, and cost reduction and weight reduction can be achieved.

In addition, in the configuration of the comparative example shown in FIG. 17, when the mounting frame 12a is temporarily fixed to the fixture 20a, the nuts 35 inserted into and arranged at the guide rail sections 13b and 13c of the mounting frame 12a need to be moved to positions of the long holes 24a of the fixture 20a. Additionally, the bolts 26 need to be screwed into in a state of holding the nuts 35 at desired positions. Therefore, ease of working at the time of temporarily fixing the mounting frame 12a is not good. In contrast with this, according to the fixture 20 of the embodiment, since the female screw hole 24 is formed in the support sections 22a and 22b, respectively, the mounting frame 12 can be temporarily fixed by the bolts 26 without using the special nut with the operation pin as described above. Accordingly, cost reduction and improvement in ease of construction can be achieved.

Further, in the configuration of the comparative example shown in FIG. 17, the guide rail section 13a is formed in the upper portion of the mounting frame 12a, and the pressing metal fitting 39 is attached to the bolt 30 slidably inserted into and arranged at the guide rail section 13a, and is fastened by the nut 33. In contrast with this, the embodiment is configured such that a bolt is not used for fixing the solar cell modules 1a and 1b to the mounting frame 12 as mentioned above. Accordingly, the bolt 30 and the nut 33 as in the comparative example, and a not-shown washer, can be omitted, and cost reduction and improvement in ease of construction can be achieved.

Figure 18:
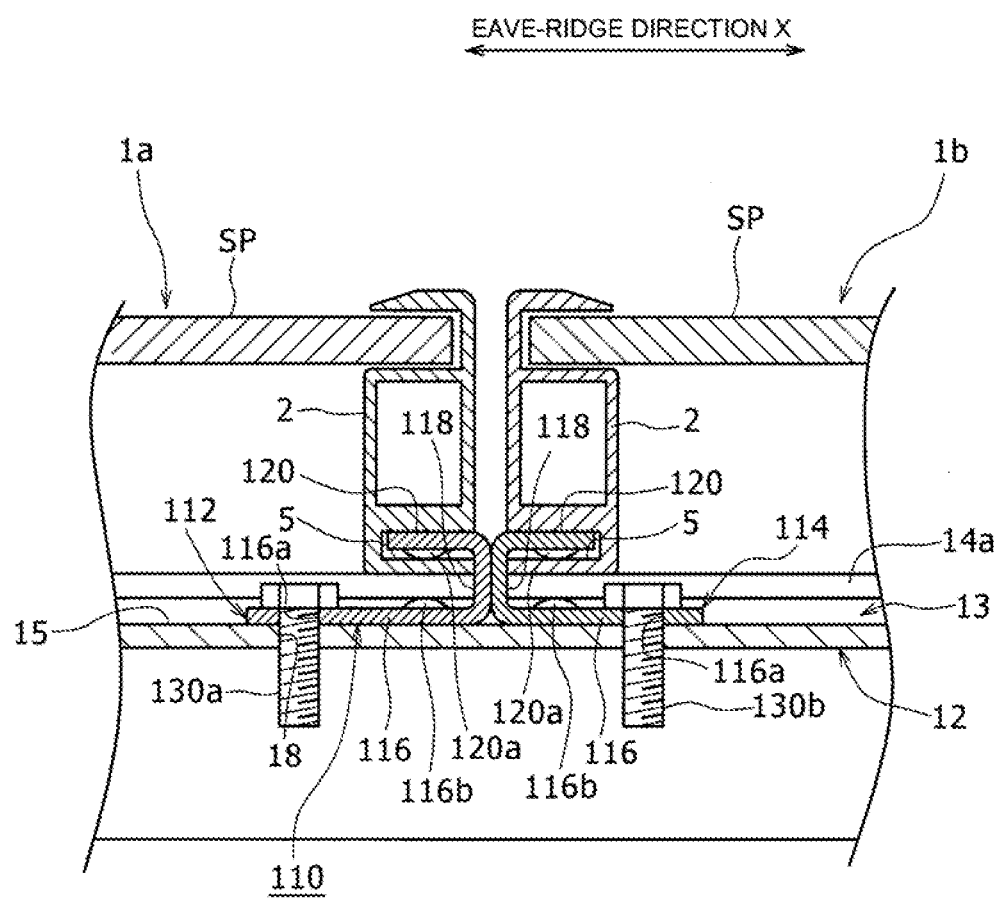
FIG. 18 is a view corresponding to a lower portion of FIG. 12 showing another example of the embodiment according to the present disclosure.
Figure 19:
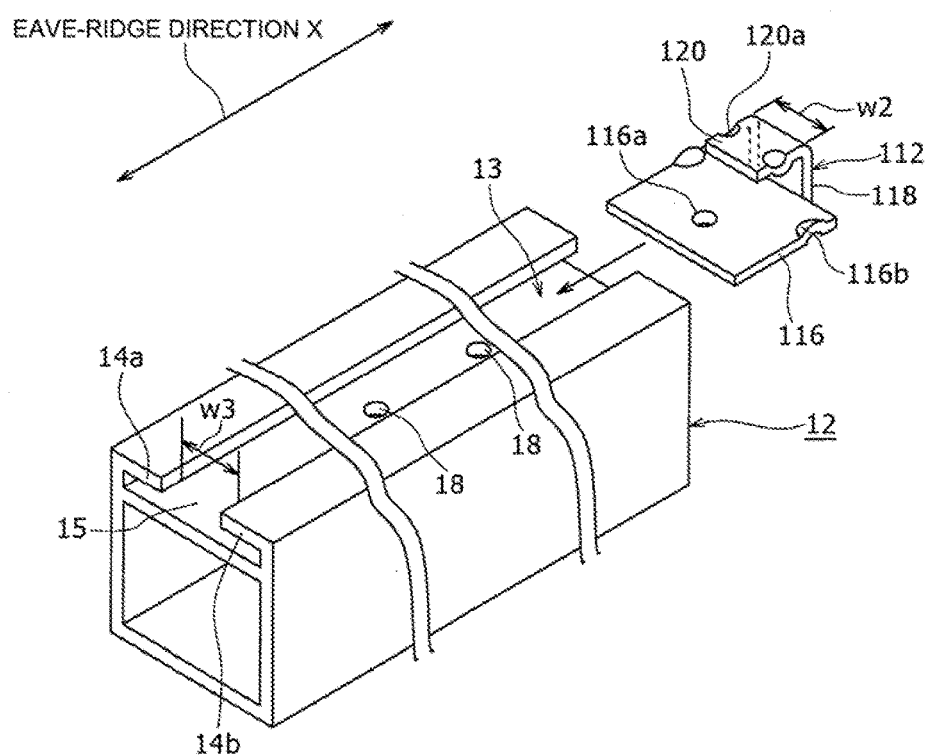
FIG. 19 is a perspective view showing a mounting frame, and a first fixing metal fitting included in an intermediate fixing member, in a state of being separated from each other in a configuration of FIG. 18.

FIG. 18 is a view corresponding to a lower portion of FIG. 12 showing another example of the embodiment according to the present disclosure. FIG. 19 is a perspective view showing the mounting frame 12, and a first fixing metal fitting 112 included in an intermediate fixing member 110 in a state of being separated from each other. FIGS. 20A to 20D are views showing construction procedures when the solar cell modules 1a and 1b are installed at the mounting frame 12 in the configuration of FIG. 18.

In a configuration of another example, in the above-described configurations of FIGS. 1 to 14, the intermediate fixing member 110 includes the first fixing metal fitting 112 and a second fixing metal fitting 114, which are two fixing metal fittings. The first fixing metal fitting 112 has an upper-end plate section 120 inserted into the external groove section 5 of the ridge-side module frame 2 included in the eave-side solar cell module 1a.

Specifically, as shown in FIG. 19, the first fixing metal fitting 112 has: a base section 116 slidably engaged with the guide rail section 13 of the mounting frame 12; and an upright wall section 118 provided to stand substantially vertically on a ridge-side end of the base section 116. A width w2 of the upright wall section 118 is smaller than a width of the base section 116 so as to be smaller than the width w3 of the upper opening of the guide rail section 13. The upright wall section 118 is therefore configured so as not to interfere with the respective protrusion parts 14a and 14b of the guide rail section 13. The upper-end plate section 120 that is bent substantially at a right angle to the upright wall section 118 and extends on the cave side is formed at an upper end of the upright wall section 118. The upper-end plate section 120 corresponds to an cave-side insertion section. A width of the upper-end plate section 120 is the same as the width w2 of the upright wall section 118. A length of the upper-end plate section 120 in an eave-ridge direction X is smaller than a length of the base section 116 in the eave-ridge direction X.

A base-side through hole 116a is formed in an intermediate portion of the base section 116 of the first fixing metal fitting 112. A bolt 130a is inserted into the base-side through hole 116a as a positioning pin-equivalent member as will be described later. In addition, an upper-side projection section 116b that projects upwardly is formed at both ends of the base section 116 in a width direction. The upper-side projection section 116b is formed by swaging both ends of the base section 116 to an upper side in the width direction. The upper-side projection section 116b comes into contact with a bottom surface of the pair of protrusion parts 14a and 14b of the guide rail section 13, and securely fixes the base section 116 to the guide rail section 13. In addition, the upper-side projection section 116b brings the first fixing metal fitting 112 into contact with the guide rail section 13 to thereby configure an electric contact section for forming a ground path from the metal module frame 2 of the eave-side solar cell module 1a to the metal mounting frame 12. Meanwhile, a lower-side projection section 120a that projects downwardly is formed at both ends of the upper-end plate section 120 in a width direction by swaging to a lower side. The lower-side projection section 120a comes into contact with a bottom surface of the external groove section 5, thereby bringing an upper surface of the external groove section 5 and an upper surface of the upper-end plate section 120 into contact with each other, and the upper-end plate section 120 is securely fixed to the external groove section 5. In addition, the lower-side projection section 120a brings the first fixing metal fitting 112 into contact with the metal module frame 2 to thereby configure the electric contact section for forming the above-described ground path.

Since a basic configuration of the second fixing metal fitting 114 shown in FIG. 18 is similar to that of the first fixing metal fitting 112, the same symbol is given to portions of the second fixing metal fitting 114 in FIG. 18 that are similar to components of the first fixing metal fitting 112. In FIG. 18, a length of the base section 116 of the second fixing metal fitting 114 in the eave-ridge direction X is made to be smaller than the length of the base section 116 of the first fixing metal fitting 112 in the eave-ridge direction X. The lengths of the base sections 116 of the respective fixing metal fittings 112 and 114 in the eave-ridge direction X may be set to be the same as each other. The upper-end plate section 120 that is bent substantially at a right angle to the upright wall section 118 and extends on the ridge side is formed at the upper end of the upright wall section 118 of the second fixing metal fitting 114. The upper-end plate section 120 of the second fixing metal fitting 114 corresponds to a ridge-side insertion section.

Meanwhile, in the rail bottom surface 15 of the mounting frame 12, a frame-side through hole 18 for bolt insertion is formed in two predetermined positions of the rail bottom surface 15 of the guide rail section 13. Each frame-side through hole 18 is, for example, a circular hole. Each frame-side through hole 18 is previously formed in a factory etc. before the mounting frame 12 is placed on the roof. Bolts 130a and 130b are inserted into each frame-side through hole 18, and the frame-side through hole 18 is used to position each of the fixing metal fittings 112 and 114 into which the bolts 130a and 130b have been similarly inserted.

The upper-end plate section 120 of the first fixing metal fitting 112 is then inserted into the external groove section 5 in the ridge-side module frame 2 of the eave-side solar cell module 1a. In addition, the upper-end plate section 120 of the second fixing metal fitting 114 is inserted into the external groove section 5 in the eave-side module frame 2 of the ridge-side solar cell module 1b. Additionally, the first fixing metal fitting 112 and the second fixing metal fitting 114 are arranged side by side between the eave-side and ridge-side two solar cell modules 1a and 1b, and the intermediate fixing member 110 is thereby formed. At this time, in a state where the through hole 116a of the base section 116 of each of the fixing metal fittings 112 and 114, and the corresponding frame-side through hole 18, coincide with each other, the bolts 130a and 130b corresponding to the respective holes 116a and 18 are inserted. Each of the bolts 130a and 130b has a function of a positioning pin. Although the hole 116a of the second fixing metal fitting 114 is preferably provided for positioning of arrangement of the solar cell modules, the present disclosure may be configured not to provide the hole 116a of the first fixing metal fitting 112. In another example of the embodiment according to the present disclosure, the configuration in which the hole 116a of the first fixing metal fitting 112 has been provided is employed, and accuracy of positioning of the arrangement of the solar cell modules is thereby enhanced.

Figure 20:
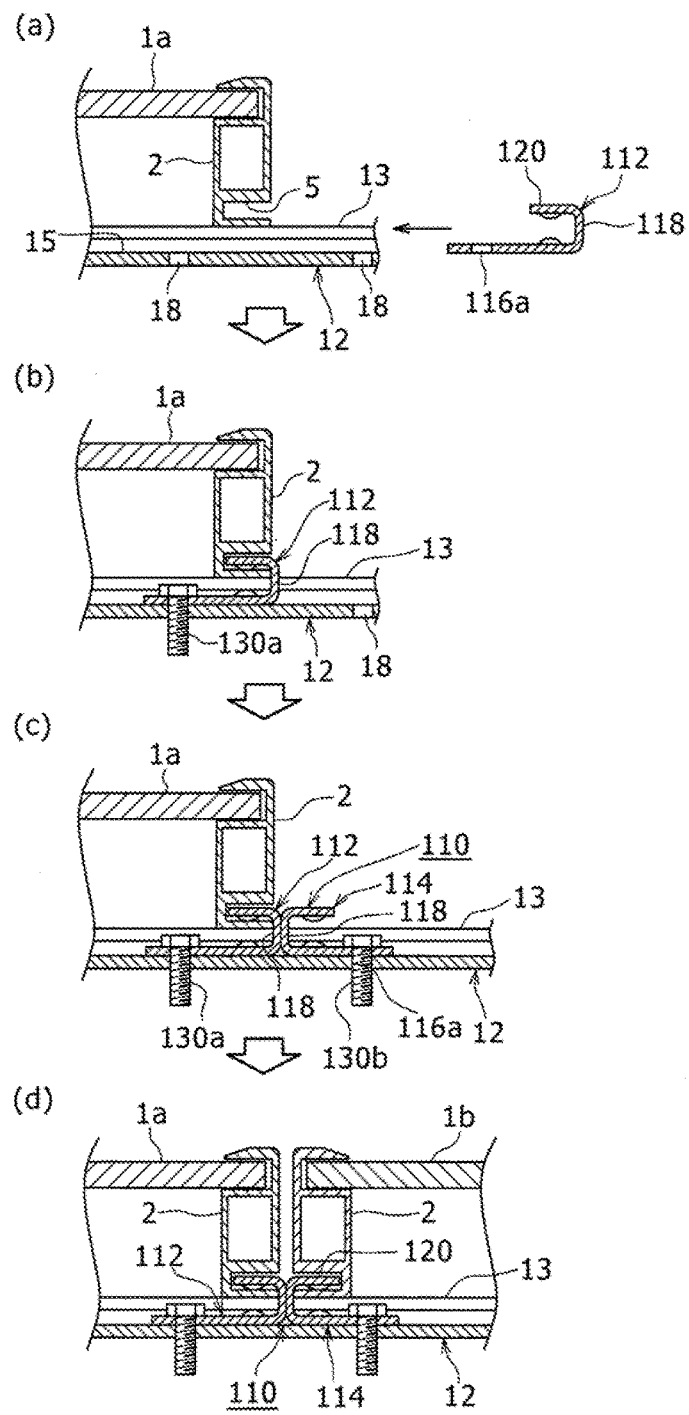
FIG. 20 is a view showing construction procedures when a solar cell module is installed on the mounting frame in the configuration of FIG. 18.

With reference to FIG. 20, there will be explained work procedures at the time of fixing the solar cell modules 1a and 1b to the mounting frame 12 using the first fixing metal fitting 112 and the second fixing metal fitting 114. In the work procedures, work to fix the eave-side end of the eave-side solar cell module 1a to the mounting frame 12, and work to fix the ridge-side end of the ridge-side solar cell module 1b to the mounting frame 12, are similar to the above-described FIGS. 13(a) and 13(d), respectively. In FIG. 20, similarly to FIG. 13, a left side is set to be an eave side, a right side is a ridge side, and the mounting frame 12 and the solar cell modules 1a and 1b are shown as horizontal attitudes.

First, the eave-side fixing member 50a (FIG. 13) is fixed to the eave-side end of the mounting frame 12, and the eave-side fixing member 50a is inserted into the external groove section 5 of the module frame 2 of the solar cell module 1a installed on the eave side. As shown in FIG. 20(a), the first fixing metal fitting 112 inserted into the guide rail section 13 is then slid and moved from the ridge side of the mounting frame 12 to the eave side. As a result, as shown in FIG. 20(b), the upper-end plate section 120 of the first fixing metal fitting 112 is inserted into the external groove section 5 formed in the module frame 2 of the ridge-side solar cell module 1a. The bolt 130a is then inserted into the base-side through hole 116a of the first fixing metal fitting 112 and the frame-side through hole 18 from an upper side, thereby performing positioning of the first fixing metal fitting 112.

Next, as shown in FIG. 20(c), the bolt 130b is inserted into the base-side through hole 116a of the second fixing metal fitting 114 and the frame-side through hole 18 from the upper side in a state where the upright wall section 118 of the second fixing metal fitting 114 is aligned back-to-back with the upright wall section 118 of the first fixing metal fitting 112. As a result, positioning of the second fixing metal fitting 114 is performed. For this reason, the upright wall sections 118 of the first fixing metal fitting 112 and the second fixing metal fitting 114 are arranged side by side, and the intermediate fixing member 110 is thereby formed. Additionally, as shown in FIG. 20(d), the solar cell module 1b installed on the ridge side is placed on the mounting frame 12, and the upper-end plate section 120 of the second fixing metal fitting 114 is inserted into the external groove section 5 of the eave-side module frame 2. Thus, the ridge-side solar cell module 1b is positioned to the mounting frame 12. At this time, the intermediate fixing member 110 may become a state of being sandwiched between the respective module frames 2 of the two solar cell modules 1a and 1b substantially without a gap as shown in FIG. 20(d) or the two solar cell modules 1a and 1b may be fixed in a state where the first fixing metal fitting 112 and the second fixing metal fitting 114 that form the intermediate fixing member 110 are separated from each other. As described above, the intermediate fixing member 110 may be formed of two components. The other configurations and actions are similar to the configurations of FIGS. 1 to 14.

Figure 21:
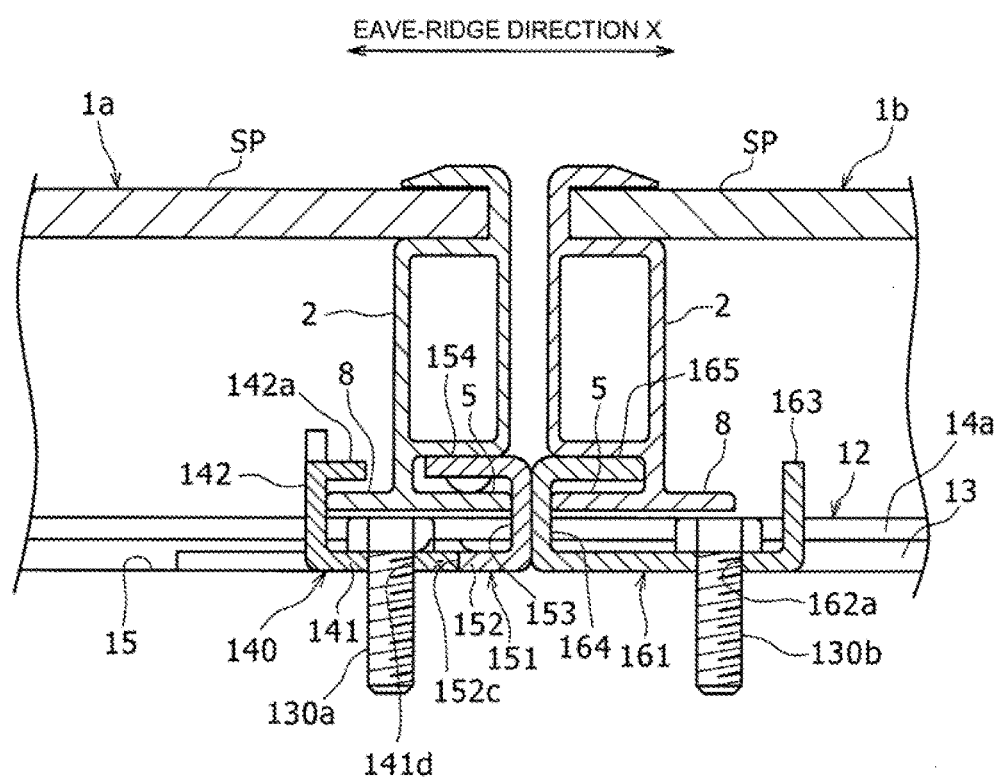
FIG. 21 is a view corresponding to the lower portion of FIG. 12 showing another example of the embodiment according to the present disclosure.
Figure 22:
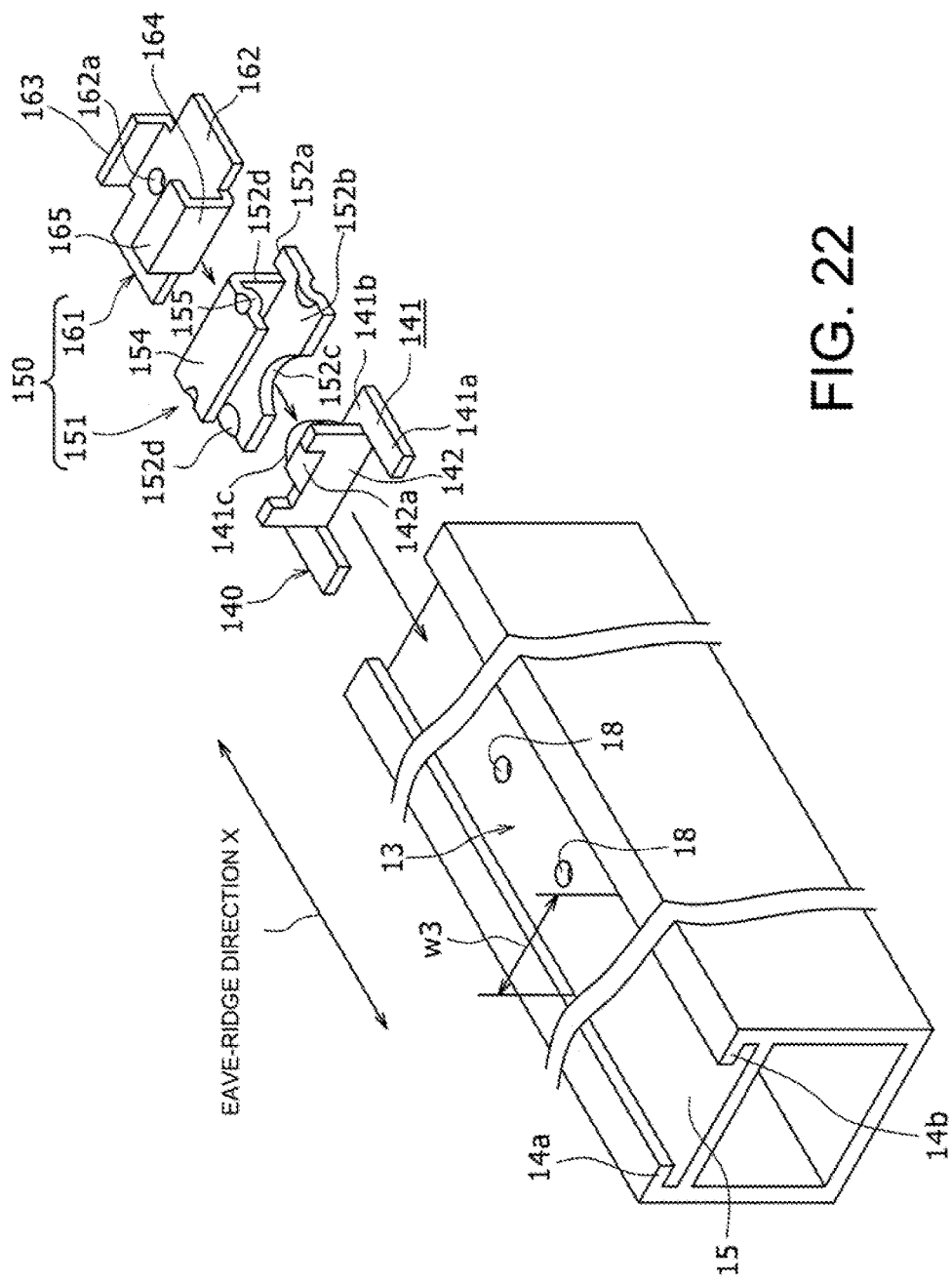
FIG. 22 is a perspective view showing a mounting frame and a plurality of fixing metal fittings in a state of being separated from each other in a configuration of FIG. 21.

FIG. 21 is a view corresponding to the lower portion of FIG. 12 showing another example of the embodiment according to the present disclosure. FIG. 22 is a perspective view showing the mounting frame 12, the first fixing metal fitting 140, and two fixing metal fittings 151 and 161 included in an intermediate fixing member 150, in a state of being separated from each other in a configuration of FIG. 21, In a configuration of another example, in the above-described configuration of FIGS. 18 to 20, an internal flange section 8 that projects to an inside of the solar cell panel SP in the eave-ridge direction X is formed at lower ends of the eave-side and ridge-side module frames 2 included in the solar cell modules 1a and 1b. The intermediate fixing member 150 is then formed by the second fixing metal fitting 151 and third fixing metal fitting 161, which will be described later, and the intermediate fixing member 150 is sandwiched by the module frames 2 of the two eave-side and ridge-side solar cell modules 1a and 1b.

Further, the first fixing metal fitting 140 and the second fixing metal fitting 151 are used in order to fix the ridge-side module frame 2 of the eave-side solar cell module 1a to the mounting frame 12.

Figure 23:
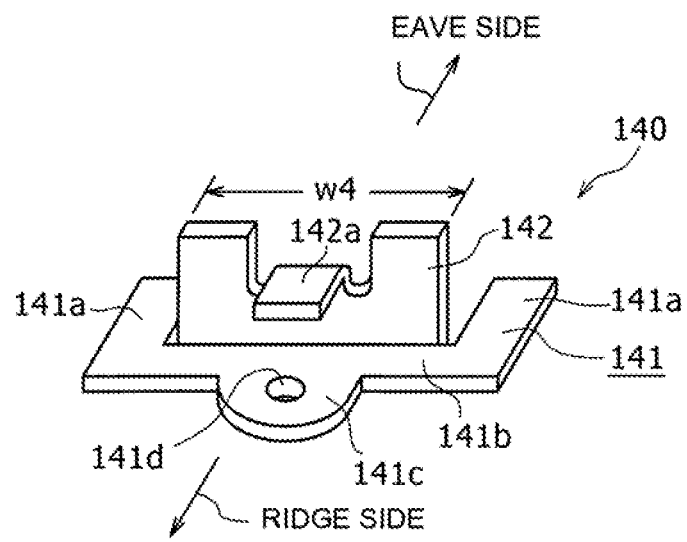
FIG. 23 is a perspective view showing a first fixing metal fitting in the configuration of FIG. 21.

Hereinafter, the first fixing metal fitting 140 and the second fixing metal fitting 151 will be explained with reference to FIGS. 22 to 24. As shown in FIGS. 22 and 23, the first fixing metal fitting 140 has: a base section 141 slidably engaged with the guide rail section 13 of the mounting frame 12; and an upright wall section 142 provided to stand substantially vertically on the base section 141. In FIG. 22, a left side is an eave side, and a right side is a ridge side. The base section 141 has: a pair of legs 141a along the eave-ridge direction X; and a coupling section 141b that couples a ridge-side end of each leg 141a, and is formed in a substantially U shape in a plan view. The coupling section 141b extends in a direction perpendicular to a length direction of each leg 141a. A semicircular section 141c that projects to the ridge side is formed in a center portion of the coupling section 141b. A base-side through hole 141d for inserting the bolt 130a is formed in the semicircular section 141c.

The upright wall section 142 is provided to stand on an eave-side end of the coupling section 141b included in the base section 141. The upright wall section 142 has a substantially U shape seen from the eave-ridge direction X, and has an internal locking section 142a formed to be bent at substantially a right angle to the upright wall section 142 so as to extend on the ridge side, the internal locking section 142a being located in an intermediate portion of an upper end in a width direction. A width w4 of the upright wall section 142 is smaller than the width w3 of the upper opening of the guide rail section 13. As a result, the upright wall section 142 is configured so as not to interfere with the respective protrusion parts 14a and 14b of the guide rail section 13.

Figure 24:
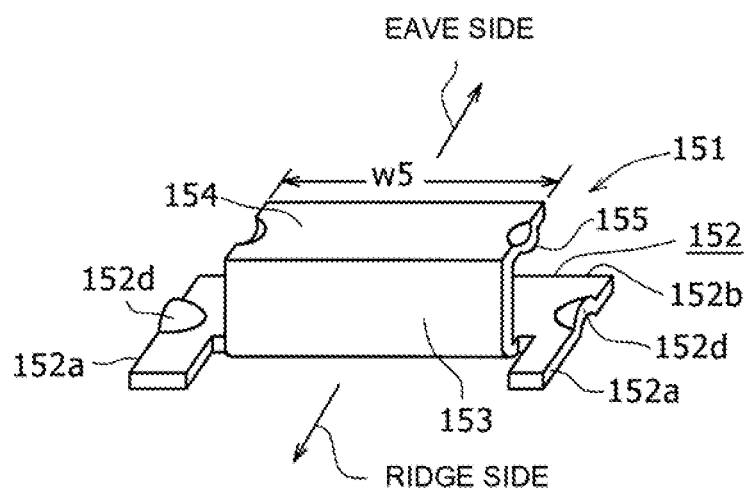
FIG. 24 is a perspective view showing a second fixing metal fitting included in an intermediate fixing member in the configuration of FIG. 21.

As shown in FIGS. 22 and 24, the second fixing metal fitting 151 has: a base section 152 slidably engaged with the guide rail section 13 of the mounting frame 12; and an upright wall section 153 provided to stand substantially vertically on the base section 152. The base section 152 has:

a pair of legs 152*a* along the eave-ridge direction X; and a coupling section 152*b* that couples an eave-side end of each leg 152*a*, and is formed in a substantially U shape in the plan view. The coupling section 152*b* extends in a direction perpendicular to a length direction of each leg 152*a*. A concave portion 152*c* (FIG. 22), which is a semicircular-shaped depression, is formed in a center portion of an eave-side end of the coupling section 152*b*, the center portion being opposed to the semicircular section 141*c* of the first fixing metal fitting 140 (FIG. 23). As a result, an eave-side edge of the coupling section 152*b* of the second fixing metal fitting 151 has a shape matching a ridge-side edge of the coupling section 141*b* of the first fixing metal fitting 140. An upper-side projection section 152*d* similar to the upper-side projection section 16*b* of the first fixing metal fitting 112 explained in the above-described configuration of FIG. 19 is formed at both ends of the coupling section 152*b* of the second fixing metal fitting 151 in a width direction.

The upright wall section 153 is provided to stand on a ridge-side end of the coupling section 152*b* included in the base section 152. The upright wall section 153 has a rectangular shape seen from the eave-ridge direction X, and has an upper-end plate section 154, which is an eave-side insertion section that is formed to be bent at substantially a right angle to the upright wall section 153 in an upper end, and that extends on the eave side. A width w5 of the upright wall section 153 is smaller than the width w3 of the upper opening of the guide rail section 13. As a result, the upright wall section 153 is configured so as not to interfere with the respective protrusion parts 14*a* and 14*b* of the guide rail section 13. A lower-side projection section 155 similar to the lower-side projection section 120*a* of the first fixing metal fitting 112 explained in the above-described configuration of FIG. 19 is formed at both ends of the upper-end plate section 154 in a width direction.

The third fixing metal fitting 161 shown in FIG. 22 is similar to a configuration in which the upright wall section 163 is provided to stand on the ridge-side end of the base section 116 in the second fixing metal fitting 114 of the configuration of FIGS. 18 to 20. Specifically, the third fixing metal fitting 161 has: a base section 162; and two upright wall sections 163 and 164 provided to stand on both ends of the base section 162 in the eave-ridge direction X. An upper-end plate section 165, which is a ridge-side insertion section extending on the ridge side, is formed at an upper end of the eave-side upright section 164. A base-side through hole 162*a* for inserting the bolt 130*b* is formed in the base section 162. Note that although a projection section that projects in the up-and-down direction by formation of a swaging section is not formed at the base section 162 and the upper-end plate section 165 of the third fixing metal fitting 161, the projection section may be formed.

Meanwhile, the frame-side through hole 18 is formed in two positions of the intermediate portion of the mounting frame 12 in the eave-ridge direction X similarly to the configuration of FIG. 19. As will be described later, the first fixing metal fitting 140 is positioned by the bolt 130*a* inserted into the eave-side through hole 18 of the two frame-side through holes 18. An eave-side end of the second fixing metal fitting 151 is made to abut against a ridge side of the first fixing metal fitting 140. In addition, the third fixing metal fitting 161 is positioned by the bolt 130*b* inserted into the ridge-side through hole 18 of the two frame-side through holes 18.

Figure 25:
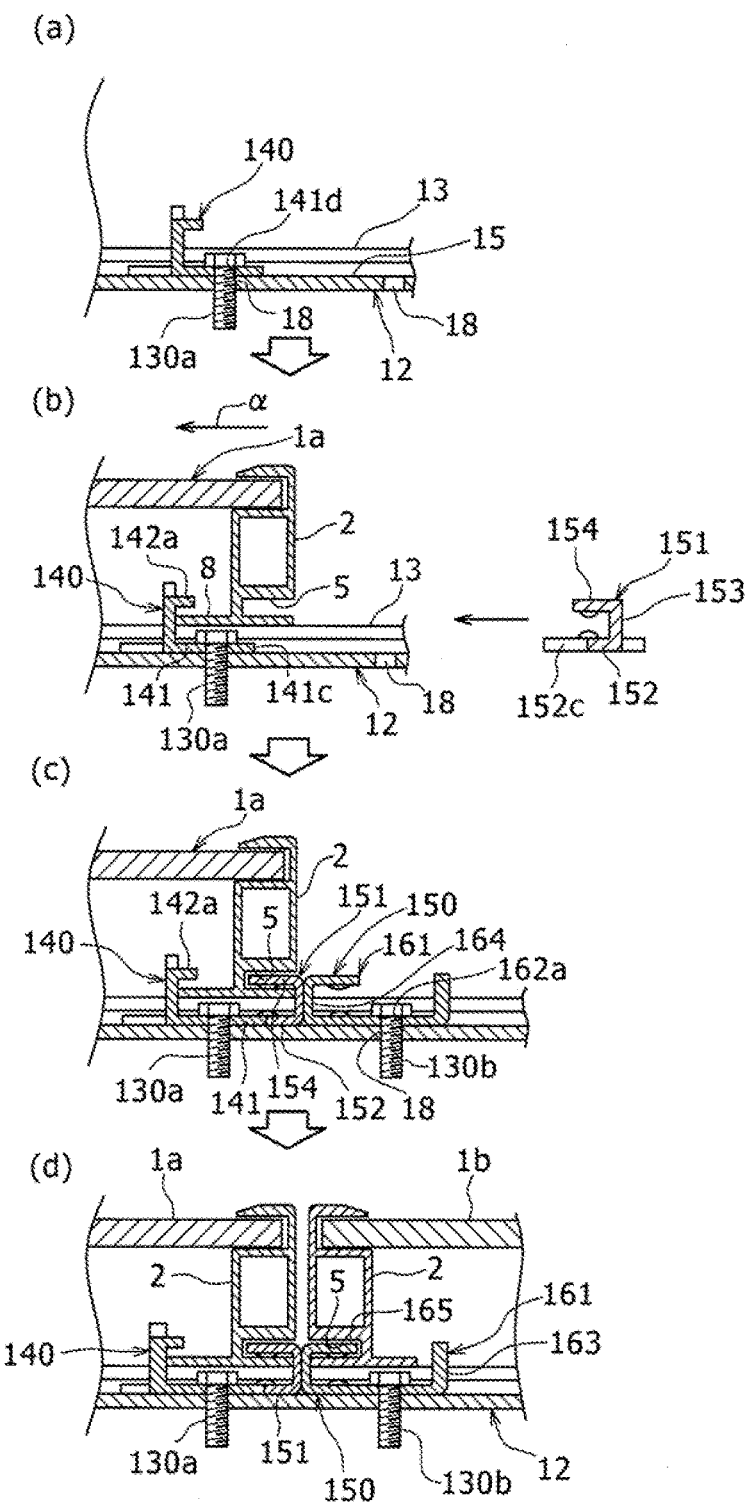
FIG. 25 is a view showing work procedures when the solar cell module is installed on the mounting frame in the configuration of FIG. 21.

Work procedures at the time of fixing the solar cell modules 1*a* and 1*b* to the mounting frame 12 using the respective fixing metal fittings 140, 151, and 161 will be explained with reference to FIG. 25. In the work procedures, work to fix the cave-side end of the eave-side solar cell module 1*a* to the mounting frame 12, and work to fix the ridge-side end of the ridge-side solar cell module 1*b* to the mounting frame 12 are similar to the above-described FIGS. 13(*a*) and 13(*d*), respectively. In FIG. 25, a left side is set to be an eave side, a right side is a ridge side similarly to FIG. 13.

First, as shown in FIG. 25(*a*), the first fixing metal fitting 140 is previously slid and moved to the guide rail section 13, and is arranged at an intermediate portion thereof in a length direction, before the mounting frame 12 is placed on the roof. The bolt 130*a* inserted into the base-side through hole 141*d* of the first fixing metal fitting 140 is then inserted into the frame-side through hole 18 of the mounting frame 12, and the first fixing metal fitting 140 is positioned. Note that the second fixing metal fitting 151 and the third fixing metal fitting 161 are also previously slid and moved to the guide rail section 13 of the mounting frame 12, and are arranged at the intermediate portion thereof. In this state, positioning of the third fixing metal fitting 161 by the bolt 130*b* has not been performed yet. Additionally, in a state where the mounting frame 12 is fixed to a predetermined position on the roof, the solar cell module 1*a* installed on the eave side is placed on the mounting frame 12, the cave-side fixing member 50*a* is inserted into the external groove section 5 of the eave-side module frame 2, and the solar cell module 1*a* is positioned. In addition, at this time, the eave-side solar cell module 1*a* is moved in a direction shown by an arrow α of FIG. 25(*b*), and the internal flange section 8 formed at the ridge-side module frame 2 of the eave-side solar cell module 1*a* is thereby arranged at a lower side of the internal locking section 142*a* of the first fixing metal fitting 140.

Next, as shown on the right side of FIG. 25(*b*), the second fixing metal fitting 151 is slid and moved to the eave side with respect to the guide rail section 13 of the mounting frame 12. As shown in FIG. 25C, the upper-end plate section 154 of the second fixing metal fitting 151 is then inserted into the external groove section 5 of the eave-side solar cell module 1*a*. After that, an eave-side edge of the base section 152 of the second fixing metal fitting 151 is made to abut against a ridge-side edge of the base section 141 of the first fixing metal fitting 140. In this state, prevention of upward slip-off of the ridge-side module frame 2 of the eave-side solar cell module 1*a* is achieved by the internal locking section 142*a* of the first fixing metal fitting 140 and the upper-end plate section 154 of the second fixing metal fitting 151.

Next, as shown in FIG. 25(*c*), in a state where the upright wall section 164 of the third fixing metal fitting 161 is arranged side by side in contact with the second fixing metal fitting 151, the bolt 130*b* is inserted into the base-side through hole 162*a* of the third fixing metal fitting 161 and the frame-side through hole 18 from an upper side, thereby performing positioning of the third fixing metal fitting 161 is. The second fixing metal fitting 151 and the third fixing metal fitting 161 are thereby arranged side by side, thus forming the intermediate fixing member 150. Additionally, in a state where the not-shown first fixing metal fitting 140 is arranged on a ridge side of the third fixing metal fitting 161, as shown in FIG. 25(*d*), the upper-end plate section 165 of the third fixing metal fitting 161 is inserted into the external groove section 5 of the eave-side module frame 2 of the solar cell module 1*b* installed on the ridge side, and the solar cell module 1*b* is arranged. At this time, the solar cell module 1*b* is made to incline downwardly from the ridge side toward the eave side with respect to the mounting frame 12 so as to avoid interference with the upright wall section 163 of the third fixing metal fitting 161, and the upper-end plate section 165 of the third fixing metal fitting 161 is inserted into the eave-side external groove section 5. As a result, the ridge-side solar cell module 1b is positioned to the mounting frame 12. After that, referring to FIG. 13(d), the projection section 53b of the ridge-side fixing member 50b is inserted into the external groove section 5 of the module frame 2 of the solar cell module 1b. The intermediate fixing member 150 may become a state of being sandwiched between the respective module frames 2 of the two solar cell modules 1a and 1b substantially without a gap, or the two solar cell modules 1a and 1b may be fixed in a state where the second fixing metal fitting 151 and the third fixing metal fitting 161 that form the intermediate fixing member 150 are separated from each other. The other configurations and actions are similar to the configurations of FIGS. 18 to 20. Note that the respective fixing metal fittings 112, 114, 140, 151, and 161 are positioned at the mounting frame 12 by the bolt in the configurations of FIGS. 18 to 25. Meanwhile, since the bolt is used as a pin-equivalent material, a bar-shaped pin or a pin with a head may be used instead of the bolt.

Note that in the configurations of FIGS. 21 to 25, the third fixing metal fitting 161 (FIG. 22) positioned by a positioning pin, such as a bolt, may be arranged at the eave-side end of the mounting frame 12 instead of the eave-side fixing member 50a (FIG. 13). Additionally, in the eave-side module frame of the eave-side solar cell module 1a, the upper-end plate section 165 of the third fixing metal fitting 161 may be inserted into the external groove section 5, and the third fixing metal fitting 161 is positioned.

Note that the fixing structure of the solar cell module according to the present disclosure is not limited to the above-mentioned embodiment and modified examples thereof, and that various changes and improvement can be made in items described in claims of the present application and equivalent scopes thereof.

For example, although in the above-described configurations of FIGS. 1 to 14, the present disclosure is configured such that the upper-side wall section 56 of the upright wall section 52c of the intermediate fixing member 50c is sandwiched between the module frames 2 of the solar cell modules 1a and 1b, the present disclosure is not limited to this. For example, the present disclosure may be configured such that the module frames 2 of the solar cell modules 1a and 1b are installed in contact with each other over an entire length of a long-side side surface without forming the upper-side wall section 56. In this case, the intermediate fixing member 50c is formed in a substantially "H" shape at its end surface when seen from a direction perpendicular to a sliding direction on the mounting frame 12. In addition, in this case, the depth d of the external groove section 5 of the module frame 2 may be set to be large, or the projection length n of the projection sections 53c and 53d of the intermediate fixing member 50c may be set to be short. Further, as shown by a broken line 7 in FIG. 2, a length of a lower portion of the external groove section 5 may be reduced in the module frame 2, and the lower portions may be set not to interfere with each other between the adjacent module frames 2. In the manner as described above, rigidity of the entire solar cell apparatus including the two solar cell modules 1a and 1b, and the mounting frames 12, can be further increased, and the reduction in the length of the lower portion of the external groove section 5 can contribute to shortening of the length of the mounting frame 12, albeit only slightly.

In addition, although the case has been explained in the above where the two solar cell modules 1a and 1b are fixed, in a case where three or more solar cell modules are arranged side by side in the eave-ridge direction, the present disclosure may be configured such that an intermediate fixing member is arranged at two or more places where the solar cell modules are adjacent to each other.

REFERENCE SIGNS LIST 1, 1a, and 1b solar cell module
2 module frame
3 internal groove section
4 and 16 tubular portion
5 external groove section
6 flange section
7 broken Line
8 internal flange section
10 fixing structure
12 and 12a mounting frame
13, 13a, 13b, and 13c guide rail section
14a and 14b protrusion part
15 rail bottom surface
16 tubular portion
17a and 17b concave portion
18 frame-side through hole
20 and 20a fixture
21 and 21a base plate
22a, 22b, 22c, and 22d support section
23 screw insertion hole
24 female screw hole
24a long hole
25 and 96 through hole
26 and 30 bolt
27 support member
28 and 37 drill screw
29 wood screw
31 head
32 shank
33 and 35 nut
34 operation pin
36 cover member
39 pressing metal fitting
50a eave-side fixing member
50b ridge-side fixing member
50c intermediate fixing member
51, 51a, 51b, and 51c base section
52, 52a, 52b, and 52c upright wall section
53, 53a, and 53b projection section
53c first projection section
53d second projection section
54 upper-end wall section
55 and 95 side wall section
56 upper-side wall section
57a, 57b, 57c, and 93 groove
90a cave-side cover member
90b ridge-side cover member
91 upper-end wall section
92 side wall section
94 flat plate section
100 roof
102 roofing plate
104 tarpaulin
106 roof material
110 intermediate fixing member
112 first fixing metal fitting
114 second fixing metal fitting 116 base section
116a base-side through hole
116b upper-side projection section
118 upright wall section
120 upper-end plate section
120a lower-side projection section
130a and 130b bolt
140 first fixing metal fitting
141 base section
141a leg
141b coupling section
141c semicircular section
141d base-side through hole
142 upright wall section
142a internal locking section
150 intermediate fixing member
151 second fixing metal fitting
152 base section
152a leg
152b coupling section
152c concave portion
152d upper-side projection section
153 upright wall section
154 upper-end plate section
155 lower-side projection section
161 third fixing metal fitting
162 base section
162a base-side through hole
163 and 164 upright wall section
165 upper-end plate section
SP solar cell panel
w1, w2, w3, w4, and w5 width
X and Y arrow
d depth

The invention claimed is:

1. A solar cell apparatus comprising:
a plurality of solar cell modules wherein each solar cell module has a solar cell panel, and a plurality of module frames where each module frame is provided at a periphery of a corresponding solar cell panel;
a long mounting frame that is fixed along an eave-ridge direction on a roof, and has a guide rail section in an upper portion; and
a fixing member that is provided by being slid and moved in a longitudinal direction of the mounting frame along the guide rail section, and is fixed at a predetermined position of the mounting frame, wherein
each module frame of the plurality of modules frames is provided with: an internal groove section that stores a peripheral portion of the corresponding solar cell panel; and
an external groove section provided on an opposite side of the corresponding solar cell panel, and wherein
the fixing member has: a base section that engages with the guide rail section; an upright wall section that is provided to stand on the base section; an eave-side insertion section that extends from the upright wall section so as to be inserted into the external groove section of one of the plurality of solar cell modules installed on an eave side of the roof; and a ridge-side insertion section that extends from the upright wall section so as to be inserted into the external groove section of another of the plurality of solar cell modules installed on a ridge side of the roof,
at least one module frame of the plurality of module frames is opposed to another module frame of the plurality of module framed via the fixing member along the eave-ridge direction,
the internal groove section of each of the module frames comprises a bottom surface, an upper surface, and a side surface such that the internal groove section fits the peripheral portion of the corresponding solar cell panel,
the external groove section of each of the module frames comprises a bottom surface, an upper surface, and a side surface such that the external groove section fits the eave-side insertion section and the ridge-side insertion section, at least a part of the peripheral portion of the corresponding solar cell panel and at least a part of the eave-side insertion section or the ridge-side insertion section overlap with each other in a plan view, and the module frames are mounted on the guide rail section.

2. The solar cell apparatus according to claim 1, wherein
the eave-side insertion section is an eave-side projection section provided in a projecting manner at the upright wall section so as to be inserted into the external groove section of the corresponding solar cell module installed on the eave side of the roof, and wherein
the ridge-side insertion section is a ridge-side projection section provided in a projecting manner at the upright wall section so as to be inserted into the external groove section of the corresponding solar cell module installed on the ridge side of the roof.

3. The solar cell apparatus according to claim 2, wherein the upright wall section of the fixing member has an upper-side wall section that extends above the eave-side projection section and the ridge-side projection section, and is sandwiched between the ridge-side module frame and the eave-side module frame of at least two adjacent solar cell modules of the plurality of solar cell modules.

4. The solar cell apparatus according to claim 3, wherein an upper end surface of the upright wall section of the fixing member is formed so as to be substantially flush with the ridge-side frame and the eave-side frame located on both sides of the upper end surface.

5. The solar cell apparatus according to claim 1, wherein the fixing member is fixed to the mounting frame by a screw that penetrates the base section and the mounting frame, and a groove section indicating a position that the screw is made to penetrate is formed in the base section along a direction perpendicular to a longitudinal direction of the mounting frame.

6. The solar cell apparatus according to claim 1, further comprising a fixture by which the mounting frame is fixed to the roof, wherein
the fixture has: a fixing section fixed to the roof; and a pair of support sections extending upwardly from the fixing section and opposed to each other with an interval substantially corresponding to a width of the mounting frame, a female screw hole is formed in at least one of the support sections, and a tip of a bolt screwed into the female screw hole abuts against the mounting frame whose height has been adjusted to be a desired height and that has been arranged between the support sections, thereby the mounting frame is temporarily fixed.

7. The solar cell apparatus according to claim 6, wherein burring is performed on the support section formed of a metal plate, an inner peripheral surface thereof is threaded, and as a result the female screw hole is formed.

8. The solar cell apparatus according to claim 6, wherein the support section of the fixture is formed integrally with the fixing section by folding a portion partitioned by a notch formed in one metal plate.

9. The solar cell apparatus according to claim 6, wherein a through hole is formed in the support section of the fixture, and the mounting frame is fixed to the fixture by the screw penetrating a side wall of the mounting frame and being screwed thereinto from the through hole.

* * * * *